United States Patent
Awasthi et al.

(10) Patent No.: US 9,249,249 B2
(45) Date of Patent: Feb. 2, 2016

(54) LIGHT ABSORBING COMPOUNDS FOR OPTICAL POLYMERS

(71) Applicant: Bausch & Lomb Incorporated, Rochester, NY (US)

(72) Inventors: Alok Kumar Awasthi, Pittsford, NY (US); David P. Vanderbilt, Bradenton, FL (US); Fanqing Richard Meng, Buffalo Grove, IL (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 14/415,697

(22) PCT Filed: Jun. 25, 2013

(86) PCT No.: PCT/US2013/047580
§ 371 (c)(1),
(2) Date: Jan. 19, 2015

(87) PCT Pub. No.: WO2014/018208
PCT Pub. Date: Jan. 30, 2014

(65) Prior Publication Data
US 2015/0175732 A1    Jun. 25, 2015

Related U.S. Application Data

(60) Provisional application No. 61/674,540, filed on Jul. 23, 2012.

(51) Int. Cl.
*C08F 226/06*    (2006.01)
*C08F 226/10*    (2006.01)
(Continued)

(52) U.S. Cl.
CPC ............. *C08F 226/10* (2013.01); *C08F 220/30* (2013.01); *C08F 226/06* (2013.01); *G02B 1/041* (2013.01); *G02B 1/043* (2013.01);
(Continued)

(58) Field of Classification Search
CPC .... C08F 226/10; C08F 226/06; C08F 220/30; C08F 2220/306; G02B 1/041; G02B 1/043
See application file for complete search history.

(56) References Cited

U.S. PATENT DOCUMENTS 4,304,895 A    12/1981    Loshaek
4,528,311 A     7/1985    Beard et al.
(Continued)

FOREIGN PATENT DOCUMENTS

EP    2514791 A1    10/2012
WO    99/63366 A1   12/1999
(Continued)

OTHER PUBLICATIONS

Reisch, Johannes et al, "Natural Product Chemistry, Part 136 [1]: A Convenient Synthesis of Rutacridone and Isorutacridone" Oct. 1990, Monatscefte fur Chemie, 121, 829-835.*
(Continued)

*Primary Examiner* — Ling Choi
*Assistant Examiner* — David L Miller
(74) *Attorney, Agent, or Firm* — Toan P. Vo

(57) ABSTRACT

An optical polymeric material that can substantially block the transmission of ultraviolet light as well as selected portion of violet light. The polymeric material will include monomeric units of one or more lens monomers, and monomeric units of a monomer of formula (I).

22 Claims, 7 Drawing Sheets

(51) Int. Cl.
*C08F 220/30* (2006.01)
*G02B 1/04* (2006.01)
*C08F 220/20* (2006.01)
*C08F 220/40* (2006.01)

(52) U.S. Cl.
CPC ............ *C08F 220/20* (2013.01); *C08F 220/40* (2013.01); *C08F 2220/306* (2013.01)

(56) References Cited

U.S. PATENT DOCUMENTS 4,716,234 A 12/1987 Dunks et al.
2011/0077319 A1* 3/2011 Yasuda ..................... 522/182

FOREIGN PATENT DOCUMENTS

| WO | 2007/050395 | A2 | 5/2007 |
| WO | 2007/092933 | A2 | 8/2007 |
| WO | 2009/036903 | A1 | 3/2009 |
| WO | 2009/086444 | A1 | 7/2009 |

OTHER PUBLICATIONS

International Search Report and Written Opinion of the International Searching Authority, mailed Sep. 2, 2013 (8 pages).
International Preliminary Report on Patentability, completed Sep. 30, 2014 (12 pages).
Maksimets et al.: Absorption Spectra of 9-Nitroacridine, 6-Nitroacrio-9-One, and their Methoxy Derivatives Kharkov Pharmaceutical Institute (Mar. 21, 1965) 4 pages.
Sukhomlinov et al.: Absorption Spectra and Structure of Acrid-9-One Kharkov Pharmaceutical Institute (Feb. 15, 1965) 3 pages.
Whetsel: Spectrophotometric Determination of Anthraquinone and Benzanthrone Analytical Chemistry, vol. 25, No. 9, Sep. 1953 (4 pages).
Diaz: Absorption and Emission Spectroscopy and Photochemistry of 1,10-Anthraquinone Derivatives: A Review Journal of Photochemistry and Photobiology, A: Chemistry, 53 (1990) 141-167.
Marković et al.: Electronic Absorption Spectra of Substituted Anthraquinones and Their Simulation Using ZINDO/S Method (Journal of the Serbian Society for Computational Mechanics/vol. 2/No. 2, 2008/ pp. 73-79.
Website: http//www.signmaaldrich.com/catalog/product/fluka/44164?lang=en&region=US printed May 14, 2014 (1 page).
Website: http://www.chemicalbook.com/ChemicalProductProperty_EN_CB5285532.htm printed May 13, 2014 (1 page).
Website: http://www.worlddyevariety.com/basic-dyes/basic-orange-5.html printed May 13, 2014 (2 pages).
Website: http://www.chemicalbook.com/ChemicalProductProperty_EN_CB7378881.htm printed May 13, 2014 (2 pages).
Website: http://www.chemblink.com/products/2829-42-7.htm printed May 13, 2014 (2 pages).
Website: http://www.chemicalbook/ProductChemicalPropertiesCB502418_EN.htm printed May 13, 2014 (1 page).
Website: http://www.worlddyevariety.com/acid-dyes/acid-orange-128.html printed May 13, 2014 (2 pages).
Website: http://www.chemicalbook/ChemicalProperties_EN_CB3705069.htm printed May 13, 2014 (2 pages).
Website: http://pubchem.ncbi.nlm.nih.gov/rest/chemical/disperse+orange+3 printed May 14, 2014 (4 pages).
Website: http://www.chemicalbook/ChemicalProductProperty_EN_CB0699059.htm printed May 14, 2014 (2 pages).

* cited by examiner

LIGHT ABSORBING COMPOUNDS FOR OPTICAL POLYMERS

The invention relates to light absorbing compounds and optical polymeric materials that can include such compounds to block the transmission of select wavelengths of light through the materials. The invention also relates to ophthalmic devices comprising such polymeric materials.

BACKGROUND

Harmful effects to the eye from ultraviolet (UV) light (from about 200 nm to about 400 nm in wavelength) have long been known. UV light reaching the eye has wavelengths in the range of UV-B and UV-A (i.e., from about 280 nm to about 400 nm) and has been linked to ocular disorders of the cornea, lens and retina including macular degeneration. Accordingly, most if not all, polymeric intraocular lenses include one or more UV absorbing compounds to block the transmission of the shorter wavelengths of light of the natural solar spectrum. More recently, a similar link to the same ocular disorders by visible violet light having wavelengths from about 400 nm to about 460 nm has also been discussed. UV light is said to account for about 67% of acute UV-blue phototoxicity between 350 nm and 700 nm, and violet light is said to be responsible for about 18% of acute UV-blue phototoxicity.

The natural lens is an essential component of the light filtering system of a human eye. From age twenty on, the crystalline lens absorbs most of the UV-A radiation (between about 315 and about 400 nanometers), protecting the retina from the damaging effect of this radiation. However, when a natural lens is surgically removed as a result of cataractogenesis, the retina is no longer protected from the damaging effect of UV-A radiation. One approach used to restore normal vision is achieved by surgical insertion of an artificial polymeric lens in the eye as a substitute for the removed lens. These artificial lenses are known as intraocular lenses ("IOLs"). Therefore, any IOL intended to act as a substitute for the natural lens should provide protection to the retina against UV radiation.

U.S. Pat. No. 4,304,895 discloses the use of 2-hydroxy-4-methacryloyloxy-benzophenone and mixtures thereof as a monomeric ultraviolet light absorber copolymerizable with acrylic monomers and useful in the preparation of UV absorbing hard contact lenses. Similarly, the copolymerization of an allyl-2-hydroxy-benzophenone with an acrylate ester such as methyl methacrylate is described in U.S. Pat. No. 4,310,650, and, the copolymerization of ethylenically unsaturated derivatives of 2,4-dihydroxy benzophenone with other vinyl type comonomers is broadly disclosed in U.S. Pat. No. 3,162,676. The reported polymers that incorporate the bis-hydroxy-benzophenone compounds have little or no absorption in the violet spectral range (about 410 nm to 440 nm) even at concentrations up to 3 wt. %. In these polymers one typically observes a sharp transmission profile centered at about 380 nm with less than 20% absorption at 400 nm.

U.S. Pat. No. 4,528,311 discloses certain benzotriazole monomers which are copolymerizable with vinyl monomers such as methyl methacrylate to yield optically clear polymers useful in the preparation of intraocular and contact lenses. Representative of the disclosed benzotriazole monomers and a particularly preferred compound is 2-(2'-hydroxy-5'-methacryloyloxypropyl-3'-tert-butylphenyl)-5-chloro-2H-benzotriazole. U.S. Pat. No. 4,716,234 discloses certain benzotriazole monomers that are also copolymerizable with vinyl monomers. The benzotriazole monomers are defined by the general formula

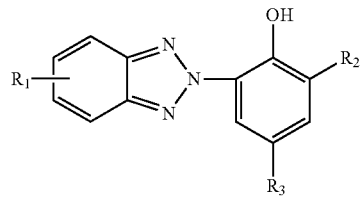

wherein $R_1$ is H, halogen or alkoxy of 1 to 3 carbon atoms, $R_2$ is H or an alkyl with 4 to 6 carbon atoms, and $R_3$ is a $C_2$-$C_{10}$ alkylene with an ethylenic polymerizable group.

Though not a critical for eye protection, there has been recent efforts of making contact lenses available with UV protection. The contact lens should not be a complete substitute for a good pair of sunglasses on a very sunny day, but contact lenses with some UV protection may prove to be clinical beneficial in some patients. For at least these reasons, there is this recognized need to provide means for protecting the human eye, e.g., the retina, from the potential harmful effects of solar radiation. In this manner, it is very desirable to provide artificial lenses that absorb UV-A and/or UV-B radiation, and perhaps, at least a portion of violet light.

SUMMARY

The invention provides an optical polymeric material that can substantially block the transmission of ultraviolet light as well as select wavelengths of violet light. The optical polymeric material will include monomeric units of one or more lens monomers, and monomeric units of a light absorbing monomer of formula I

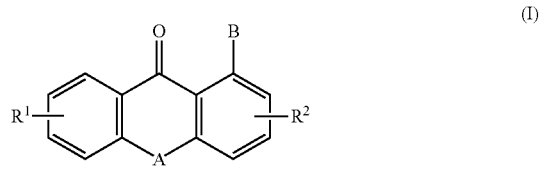

wherein A is $CH_2$, $C(CH_2)$, CHR, $CR_2$, CHOR, C(O), NH, NR, O or S; B is OH, $NH_2$ and F;

$R^1$ and $R^2$ are independently selected from the group consisting of H, Me, Et, i-propyl, t-butyl, F, Cl, Br, I, OH, OR, $NH_2$, $NH_3^+$, NHR, $NR_2$, $NH_2R^+$, $NR_3^+$, CN, C(O)OH, C(O)OR, C(O)R, Ar, OAr, SH, SR, S(O)OR, and D, wherein at least one of $R^1$ and $R^2$ is D, and D is an aliphatic radical with one to twelve carbons, includes an ethylenic polymerizable group, and is optionally substituted with oxygen or nitrogen, and wherein R is a $C_1$-$C_6$ alkyl. The invention also provides ophthalmic devices comprising such polymeric materials.

DETAILED DESCRIPTION OF THE INVENTION

Figure 1:
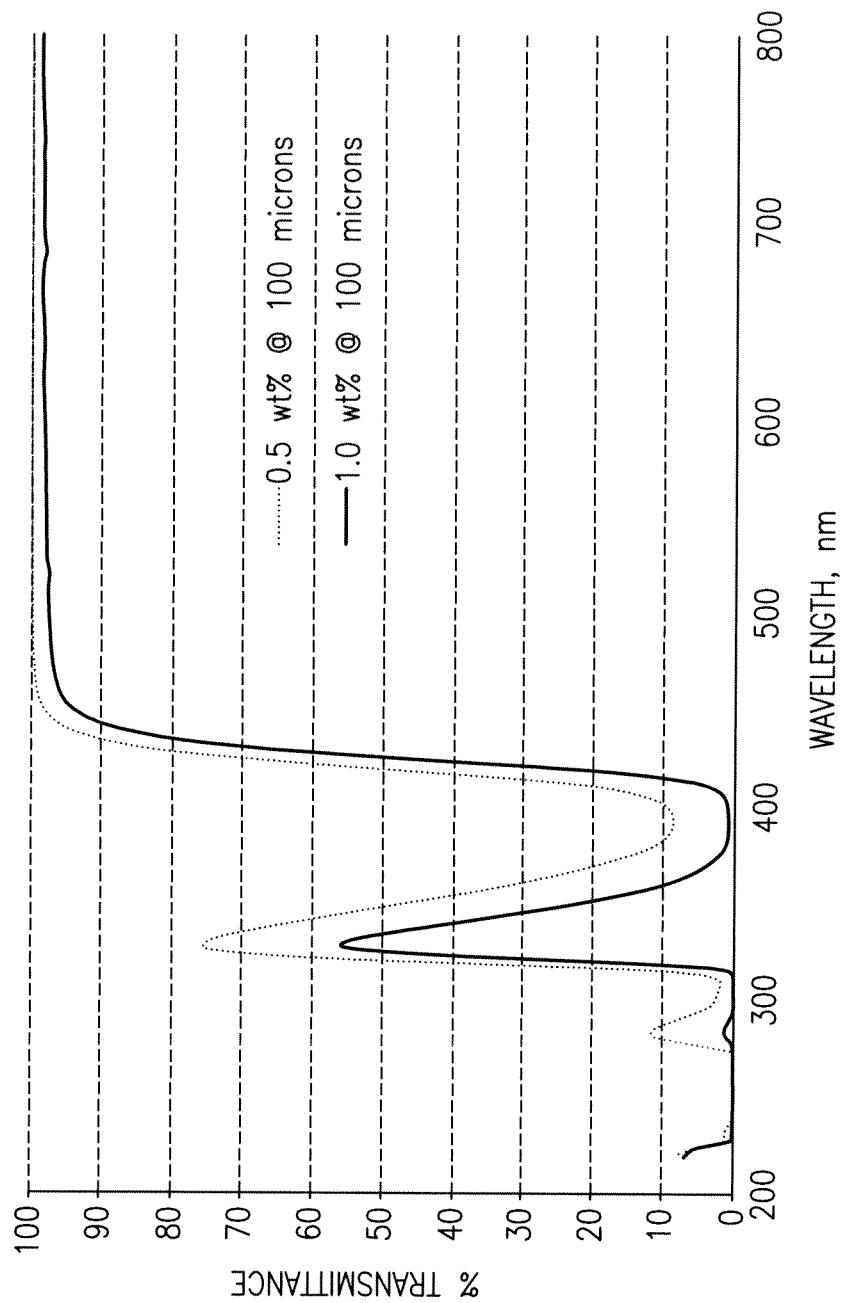
FIG. 1 shows the transmission spectrum of Example 4 at 0.5 wt. % and 1.0 wt. % in methylene chloride at 100 microns.
Figure 2:
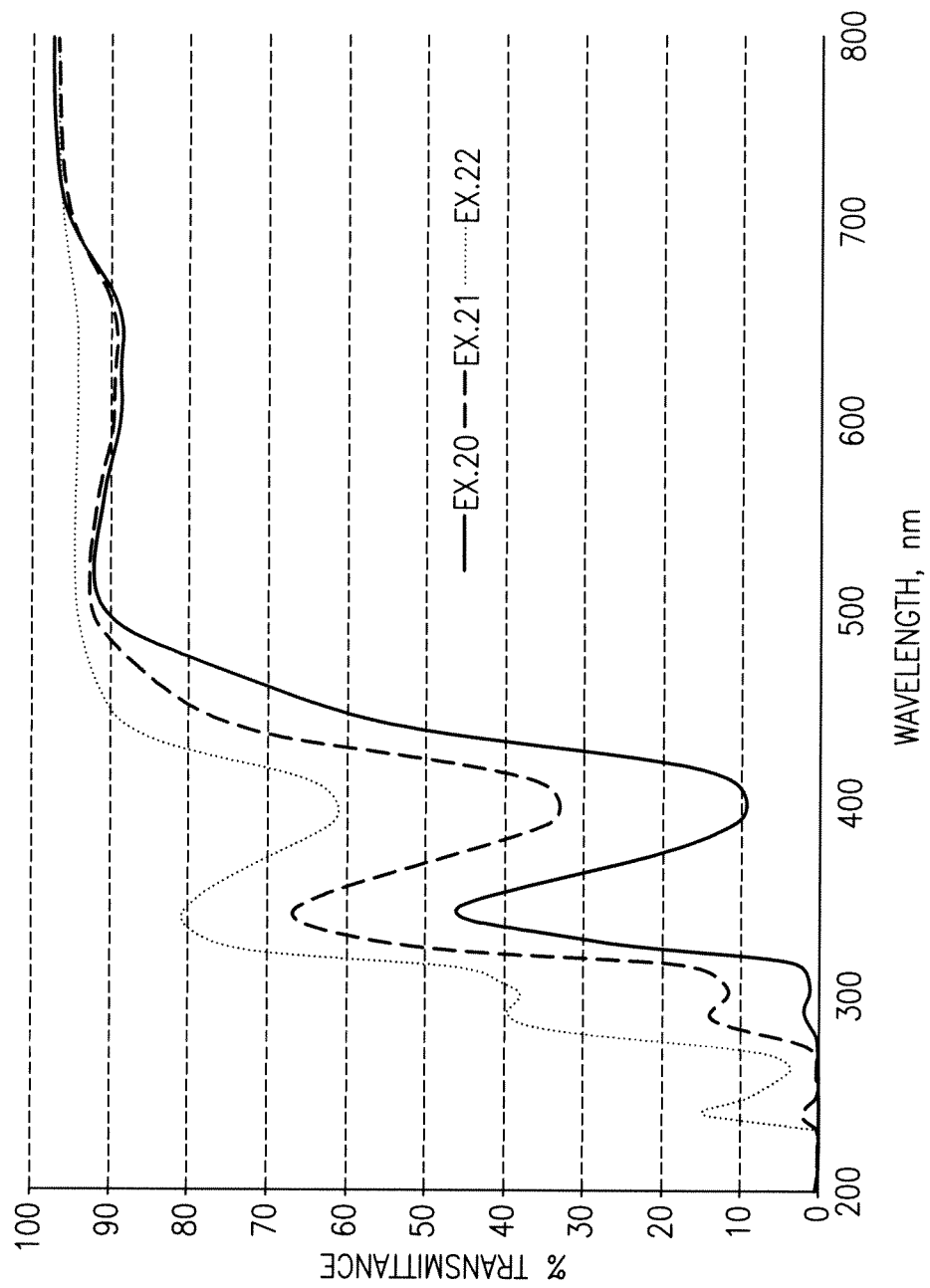
FIG. 2 shows the transmission spectra of a non-silicone hydrogel polymer with various concentrations of Example 4, Examples 20, 21 and 22.
Figure 3:
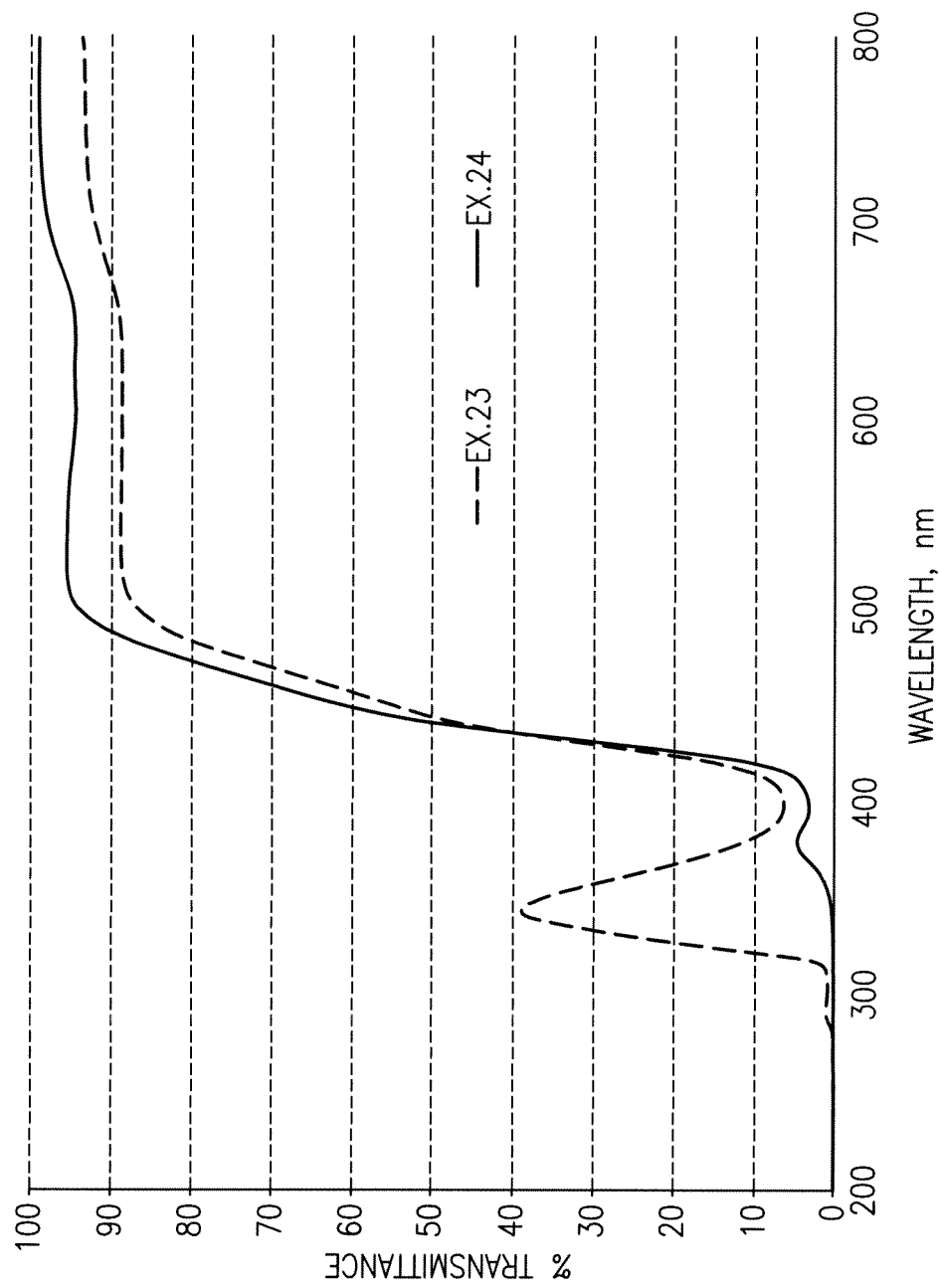
FIG. 3 shows the transmission spectra of a non-silicone hydrogel polymer of Example 23 with 3.0 wt. % Example 4; and the same polymer, Example 24, with 2.0 wt % SA-monomer and 3.0 wt. % Example 4.

As used herein, the term "optical" is used to further characterize a polymeric material that exhibits at least 85% transmittance of light in a wavelength range from 500 nm to 650 nm, the optical material having a thickness of one (1) mm.

As used herein, the term "alkyl" or "alkyl group" means a linear- or branched-chain saturated aliphatic hydrocarbon monovalent group having a stated number or range of carbon atoms, which may be unsubstituted or substituted. Non-limiting examples of alkyl groups include methyl, ethyl, n-propyl, 1-methylethyl(isopropyl), n-butyl, n-pentyl, 1,1-dimethylethyl(t-butyl), and the like.

As used herein, the term "alkylene" or "alkylene group" means a linear- or branched-chain saturated aliphatic hydrocarbon divalent radical group having a stated number or range of carbon atoms. This term is exemplified by groups such as methylene, ethylene, propylene, n-butylene, and the like.

As used herein, the term "aryl" or "aryl group" means an aromatic monovalent or divalent radical of from 6 to 10 carbon atoms having a single ring (e.g., phenyl), multiple condensed rings (e.g., naphthyl). Unless otherwise specified, the aryl ring may be attached at any suitable carbon atom which results in a stable structure and, if substituted, may be substituted at any suitable carbon atom which results in a stable structure. It may be abbreviated as "Ar".

The invention provides an optical polymeric material that can substantially block the transmission of ultraviolet light as well as a selected portion of violet light. The polymeric material will include monomeric units of one or more lens monomers, and monomeric units of a light absorbing monomer of formula I

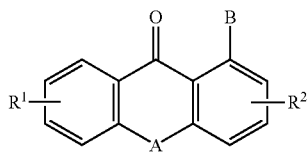

wherein A is $CH_2$, $C(CH_2)$, CHR, $CR_2$, CHOR, C(O), NH, NR, O or S; B is OH, $NH_2$ and F; $R^1$ and $R^2$ are independently selected from the group consisting of H, Me, Et, i-propyl, t-butyl, F, Cl, Br, I, OH, OR, $NH_2$, $NH_3^+$, NHR, $NR_2$, $NH_2R^+$, $NR_3^+$, CN, C(O)OH, C(O)OR, C(O)R, Ar, OAr, SH, SR, S(O)OR, and D, wherein at least one of $R^1$ and $R^2$ is D, and D is an aliphatic radical with one to twelve carbons, includes an ethylenic polymerizable group, and is optionally substituted with oxygen or nitrogen, and wherein R is a $C_1$-$C_6$ alkyl. At times, the term "lower alkyl" is used in place of the term $C_1$-$C_6$ alkyl. The invention also provides ophthalmic devices comprising the above described optical polymeric materials.

Of course, there is a relatively short list of monomers of formula I that are of particular interest. A particular sub-genus of interest is if the chemical grouping A is NH, C(O) or O. In either instance it is also of interest if B is OH or $NH_2$. In many such select monomers of formula I, it may also be of interest to have $R^2$ be D. Another relatively short list of monomers of formula I will have $R^1$ is H, Me, Cl or OR, and $R^2$ is D.

In many instances, some of the monomers of interest will have $R^2$ as D, and D is selected from —$R^4$, —$OR^4$ or —C(O) $OR^4$, wherein $R^4$ is an aliphatic radical with four to twelve carbon atoms and includes an ethylenic polymerizable group. An exemplary chemical grouping of D is defined by the following formula

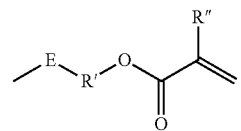

wherein R' is $C_2$-$C_8$ alkylene which may be straight chain or branched; E is O or nothing; and R" is H, $CH_3$.

Of particular interest are optical polymer materials with monomeric units represented of monomers of formula II or formula III

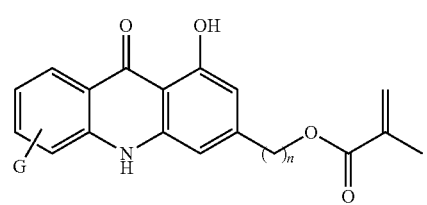

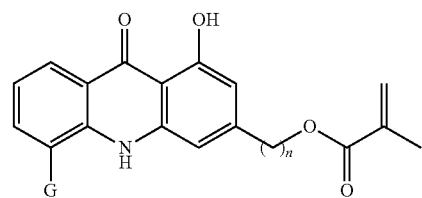

wherein G is H, Me, Cl or $OR^5$, $R^5$ is $C_1$-$C_4$ alkyl, and n is 0, 1, 2, 3, 4, 5 or 6. Still of interest are optical polymer materials with monomeric units represented of monomers selected from the group consisting of

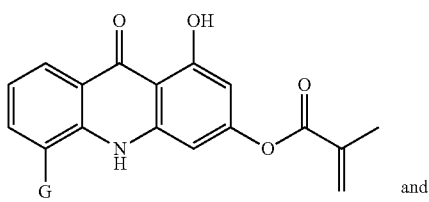

and

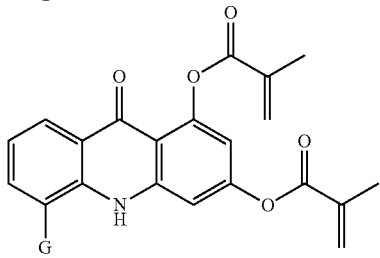

wherein G is defined above. If G is —Cl, then the compounds are identified herein as Example 4 and Example 5, respectively. See, Example Section. In many instances, The monomeric units of formula I, II or III account for 0.1 wt. % to 5 wt. % of the optical polymer material. The optical polymer can then be used to make an optical device, e.g., a contact lens, or a component of an intraocular lens.

Still another optical polymer of interest will include monomeric units from a light absorbing compound of formula IV

IV

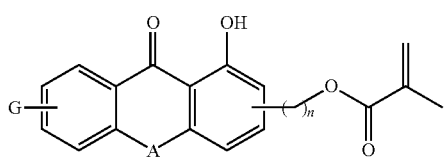

wherein A is C(O), NH, $NR^5$ or O; G is H, $C_1$-$C_4$alkyl, Cl or $OR^5$, and $R^5$ is $C_1$-$C_4$ alkyl; and n is 0, 1, 2, 3, 4, 5 or 6. As above, monomeric units of formula IV account for 0.1 wt. % to 5 wt. % of the optical polymer material. The optical polymer can then be used to make an optical device, e.g., a contact lens, or a component of an intraocular lens.

The light absorbing properties of optical polymers that include monomeric units of compounds of formula I, II, III or IV provide a near optimal transmission spectrum in the case of optical devices such as contact lenses and intraocular lenses. The compounds of formula I, II, III or IV possess a characteristic sharp transmission spectrum centered at about 420 nm to 440 nm at concentrations well suited for incorporation into a contact lens and an intraocular lens. In particular, the compounds of formula I, II, III or IV are well suited for incorporation into polymeric optical lenses characterized as non-silicone hydrogel, silicone hydrogels as well as non-hydrogel, e.g., hydrophobic acrylic materials. For example, the compounds of formula I, II, III or IV are well suited for hydrogels with a water content that exceeds 60 wt. % as well as non-hydrogel materials with little or no water content, i.e., a water content of less than 5 wt. %. In each instance, the optical lens can be optimized to filter out harmful UV radiation as well as a portion of violet light below 430 nm. At the same time, the lenses can allow for the transmission of much of the blue light, i.e., from 450 nm to 480 nm, which can be helpful to the patient under low-light conditions such as driving at night.

Accordingly, some of the more preferred optical polymers will exhibit a transmission spectrum that transmits less than 15% of light at 420 nm and transmits more than 75% of light at 450 nm. In other instances, some of the more preferred optical polymers will exhibit a transmission spectrum that transmits less than 30% of light at 420 nm and transmits more than 75% of light at 450 nm. The transmission spectrum is measured in a one millimeter thick sample of the polymer.

In addition, as shown in the transmission spectra of FIGS. 1 to 5 the compounds of formula I, II, III or IV, and optical polymeric materials that include monomeric units of such compounds will typically have what is referred to in the art as a "UV hole". For example, the transmission of Example 4 in methylene chloride at 1.0 wt. % exhibits a spike, or UV hole, which extends from about 315 nm to about 360 nm and centered at about 330 nm, FIG. 1. As shown, the size of the UV hole is concentration dependent. A similar UV hole is shown in an optical hydrogel material that includes monomeric units of Example 4, FIG. 2 and FIG. 3, Ex. 23.

To provide an optical material with a more complete blocking of UV wavelengths, that is, to plug the UV hole as described, it may be necessary to include a second light absorbing compound. The second light absorbing compound should absorb in the UV region left transparent because of the UV hole in the transmission spectrum of compounds of formula I, II, III or IV. Second light absorbing compounds of particular interest are the triazines or a class of benzotriazoles. The later is of particular interest, and include the benzotriazole compounds described by Dunks et al. in U.S. Pat. No. 4,716,234. The Dunks compounds are well known UV-absorbing compounds that have been incorporated into intraocular lenses. The Dunks compounds are generally defined by the following formula.

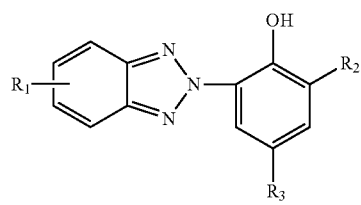

wherein $R_1$ is H, halogen or alkoxy of 1 to 3 carbon atoms, $R_2$ is selected from the group consisting of H and lower alkyl, and $R_3$ is

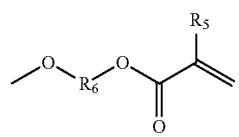

wherein $R_6$ is $C_2$-$C_{10}$ alkylene which may be straight chain or branched, and $R_5$ is H, Me. The above defined benzotriazoles can be included in the described optical polymers in amounts from 0.2% to about 3% by weight.

In several preferred embodiments, the selected benzotriazoles to be combined with a compound of formula I, II, III or IV are those referred to in the art as SA-monomer and X-monomer, the structures of which are shown below.

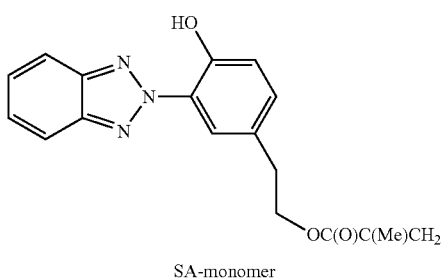

SA-monomer

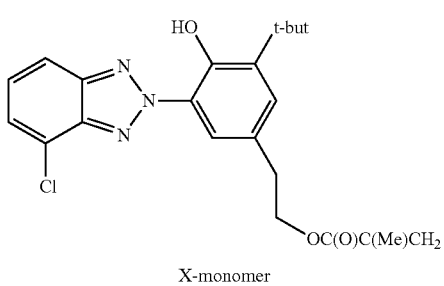

X-monomer

The optical polymeric materials described in this application can be any optical polymeric material known to those of ordinary skill in the polymeric lens art, particularly those in the art familiar with optical polymeric materials used to make intraocular lenses and contact lenses. Non-limiting examples of such materials include those used in the manufacture of ophthalmic devices, such as siloxy-containing polymers, hydrophilic or hydrophobic polymers or copolymers thereof. The optical polymeric materials are of sufficient optical clarity meaning the materials can be used in optical applications and permit the transmission of substantially all visible light with little or no light scattering at such wavelengths.

The optical polymeric materials described herein are all prepared with one or more lens monomers. A lens monomer is a monomer used to prepare the optical polymeric materials into which a compound of formula I, II, III or IV is incorporated. As understood by a person of skill in the art of developing and making optical polymers it is typical to combine two or more different lens monomers to obtain the most desired optical, chemical, and mechanical properties of such materials. Brief descriptions or summaries for some of these optical polymers and the lens monomers used to make such polymers are exemplified below.

The Optical Polymeric Materials—Contact Lenses

The optical polymeric materials can include known hydrogel materials used for contact lenses. These materials can be identified by their USAN product names such as galyfilcon A and senofilcon A sold by Johnson & Johnson under the tradename Acuvue® Advance and Acuvue® Oasys, respectively; lotrafilcon A and lotrafilcon B sold by CibaVision under the tradenames Focus® Night & Day, and O2Optix®, respectively; comfilcon A sold by Cooper under the tradename Biofinity®; and balafilcon sold by Bausch+Lomb under the tradename Purevision®. A The light absorbing or light filtering compounds of formula I, II, III or IV are copolymerized with these materials to provide contact lenses that protect the natural lens and retina from the harmful effects of UV and/or violet light. The monomer components of the above contact lens materials is as follows.

Galyfilcon A

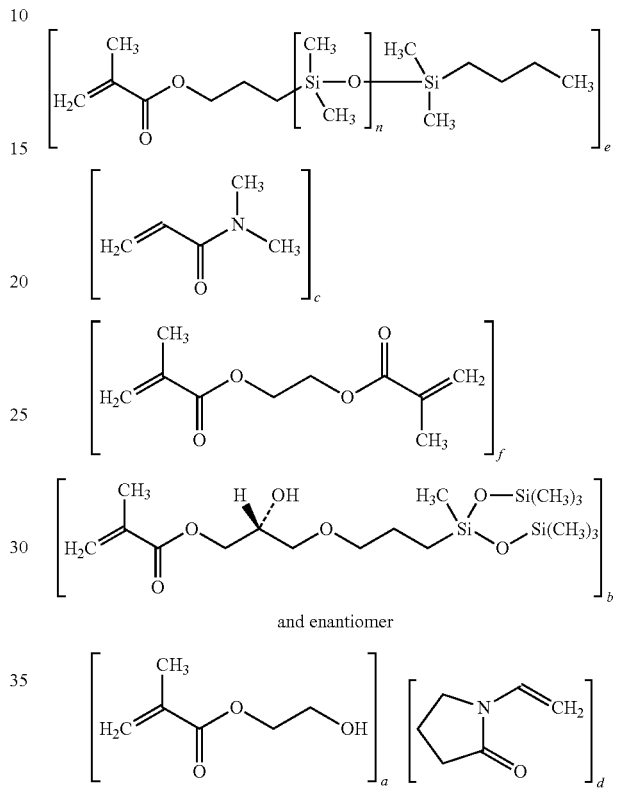

Senofilcon A

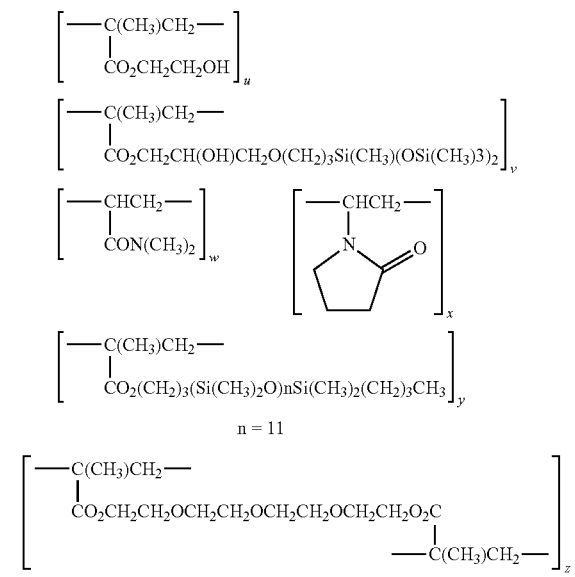

Lotrafilcon A/B

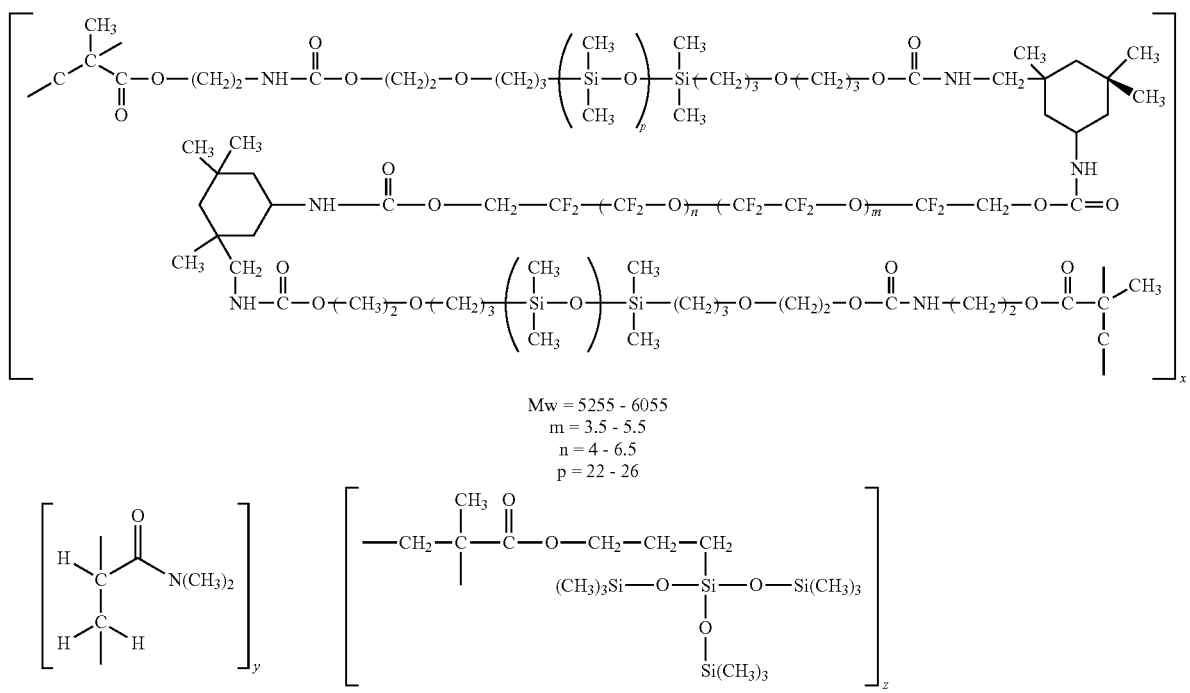

Still another silicone hydrogel of interest can be prepared with the following monomeric components in combination with one or more known hydrophilic monomers, and optionally a silicone monofunctional such as TRIS. The silicone hydrogel can be prepared from the silicone monomers of formulas 1A or 1B.

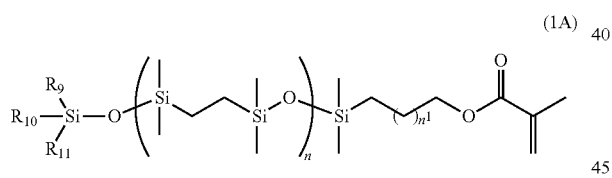
(1A)

wherein $R_9$, $R_{10}$ and $R_{11}$ are independently H, lower alkyl, lower haloalkyl or other substituted alkyl groups; n is 2 to 50, preferably n is 4 to 20, and $n^1$ is 0-10. A particular monomer is provided as formula (1B), which is referred to as M1-EDS6-TMS.

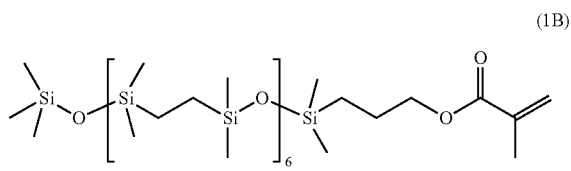
(1B)

The silicone hydrogel can also be prepared from the silicone monomers of formulas 1C or 1D.

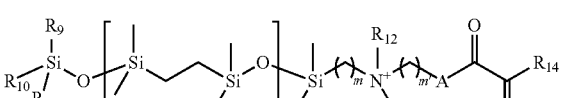
(1C)

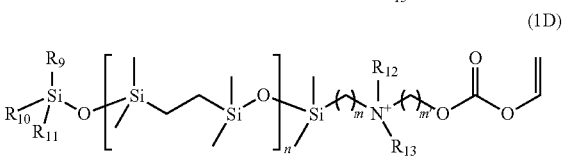
(1D)

wherein A is O or NH; $R_9$, $R_{10}$ and $R_{11}$ are independently defined as in formula 1A; $R_{12}$ and $R_{13}$ are independently H, lower alkyl; $R_{14}$ is H or Me; n is 2 to 50, preferably n is 4 to 20, and m and m' are independently 2 to 8. The preparation of monomers, 1A, 1B, 1C and 1D is described in U.S. Pat. No. 7,994,356, the entire disclosure of which is incorporated herein by reference.

Suitable hydrophilic monomers include amides such as N,N-dimethylacrylamide, N,N-dimethylmethacrylamide and the like, cyclic lactams such as N-vinyl-2-pyrrolidone and the like, poly(alkene glycols) functionalized with polymerizable groups and the like. Examples of useful functionalized poly(alkene glycols) include poly(diethylene glycols) of varying chain length containing monomethacrylate or dimethacrylate end caps. In a preferred embodiment, the poly(alkene glycol) polymer contains at least two alkene glycol monomeric units.

Some examples of silicone hydrogel materials are prepared with the monomer components listed in Table 3. To each Example monomer formulation of Table 3 one can add 0.5 wt. % to 5 wt. % of the compounds of formula I, II, III or IV. The amounts listed in Table 3 are in weight percent. As an option, one can add a known benzotriazole UV blocker to the monomer formulation so that the formulation would include at least two different light absorbing compounds to minimize transmission of selected wavelengths through the silicone hydrogel materials, particularly when these materials are casted as contact lenses.

TABLE 3

| Example | S1 | S2 | S3 | S4 | S5 | S6 | S7 |
|---|---|---|---|---|---|---|---|
| Ma2D37 crosslinker | 4.7 | 7.0 | 11.1 | 32.3 | 6.9 | 7.7 | 15.9 |
| TRIS monofunctional silicone | 38.4 | 30.5 | 29.4 | 28.0 | 34.0 | 23.1 | 15.9 |
| NVP | 29.2 | 20.5 | 27.7 | 13.8 | 30.1 | 23.1 | 23.9 |
| N,N-DMA | 1.9 | 3.0 | 2.6 | 4.3 | 4.6 | 1.5 | 4.0 |
| 2-HEMA | 7.6 | 7.0 | 6.0 | 4.3 | 4.6 | 1.5 | 4.0 |
| M1-EDS6-TMS | 13.3 | 27.0 | 18.8 | 12.9 | 12.4 | 7.7 | 15.9 |
| hexanol (diluent) | 6.9 | 6.9 | 6.9 | 6.9 | 6.9 | 6.9 | 6.9 |

The Ma2D37, dimethacrylamide crosslinker has the following structure.

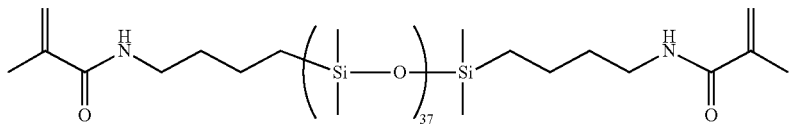

Other optical polymer materials of interest are non-silicone hydrogels, particularly, the application of these optical hydrogels for daily-disposable contact lenses. These materials are primarily prepared from two to more traditional hydrophilic monomers (infra, supra) and a strengthening monomer. Representative examples of strengthening monomers include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; and 2-isohexyl-5-hydroxycyclopentyl methacrylamide. The strengthening monomer will ordinarily be present in the monomeric mixture in an amount ranging from about 0.5 to about 25 and preferably from about 1 to about 10 weight percent, based on the total weight of the monomeric mixture.

Baush+Lomb has recently introduced a novel class of lens material sold under the tradename Biotrue® One-Day. These materials have nearly the same water content and oxygen permeability as the natural human cornea. Moreover, this material has a water retaining film or membrane that minimizes the uptake of water from the cornea, which can result in patient discomfort, particularly in a dry environment. An important monomeric or oligomeric component of this material is a functionalized poly(alkylene glycol).

A representative example of a suitable poly(alkylene glycol) which can be end terminal functionalized is a poloxamer block copolymer. One specific class of poloxamer block copolymers are those available under the trademark Pluronic (BASF Wyandotte Corp., Wyandotte, Mich.). Poloxamers include Pluronics and reverse Pluronics. Pluronics are a series of ABA block copolymers composed of poly(ethylene oxide)-poly(propylene oxide)-poly(ethylene oxide) blocks as generally represented by: $HO(C_2H_4O)_a(C_3H_6O)_b(C_2H_4O)_aH$; wherein a is independently at least 1 and b is at least 1.

Reverse Pluronics are a series of BAB block copolymers, respectively composed of poly(propylene oxide)-poly(ethylene oxide)-poly(propylene oxide) blocks as generally represented by: $HO(C_2H_4O)_b(C_3H_6O)_a(C_2H_4O)_bH$ (VIII); wherein a is at least 1 and b is independently at least 1. The poly(ethylene oxide), PEO, blocks are hydrophilic, whereas the poly(propylene oxide), PPO, blocks are hydrophobic in nature. The poloxamers in each series have varying ratios of PEO and PPO which ultimately determines the hydrophilic-lipophilic balance (HLB) of the material, i.e., the varying HLB values are based upon the varying values of a and b, a representing the number of hydrophilic poly(ethylene oxide) units (PEO) being present in the molecule and b representing the number of hydrophobic poly(propylene oxide) units (PPO) being present in the molecule.

Poloxamers and reverse poloxamers have terminal hydroxyl groups that can be terminal functionalized. An example of a terminal functionalized poloxamer and as discussed hereinbelow is poloxamer dimethacrylate (e.g., Pluronic® F127 dimethacrylate) as disclosed in U.S. Patent Application Publication No. 2003/0044468. Other examples include glycidyl-terminated copolymers of polyethylene glycol and polypropylene glycol as disclosed in U.S. Pat. No. 6,517,933. For example, a class of non-silicone hydrogels that are prepared using Pluronic® F127 dimethacrylate is described in U.S. Pat. No. 8,197,841, the entire disclosure of which is incorporated herein by reference.

The Optical Polymeric Materials—Intraocular Lenses.

As stated, optical materials of interest are those used in the manufacture of intraocular lenses. Several class of intraocular lens materials are briefly described as follows.

In one embodiment, the optical polymeric materials are prepared as a copolymer from at least three monomeric components. The first monomeric component is present in the copolymer in an amount of at least 60% by weight, and its homopolymer will have a refractive index of at least 1.50, preferably at least 1.52 or at least 1.54. The second monomeric component is present in the copolymer in an amount from 3% to 20% or from 3% to 10%, by weight. The first and second monomeric components together represent at least 70% by weight of the copolymer. The term "homopolymer" refers to a polymer that is derived substantially completely from the respective monomeric component. Minor amounts of catalysts, initiators and the like can be included, as is conventionally the case, in order to facilitate the formation of the homopolymer.

Particularly useful first monomeric components include styrene, vinyl carbazole, vinyl naphthalene, benzyl(meth) acrylate, phenyl(meth)acrylate, naphthyl(meth)acrylate, 2-phenoxyethyl(meth)acrylate, 2,3-dibromopropyl-(meth) acrylate and any one mixture thereof. Particularly useful second monomeric components include n-butyl(meth)acrylate, n-hexyl(meth)acrylate, 2-ethylhexyl-(meth)acrylate, 2-ethoxyethyl(meth)acrylate, 2,3-dibromopropyl-(meth) acrylate, 1,1-dihydroperfluorobutyl(meth)acrylate and any one mixture thereof.

The copolymer can further include a third monomeric component derived from a hydrophilic monomeric component. The hydrophilic component is present in an amount, from 2% to 30% by weight of the copolymer. The hydrophilic component is preferably present in an amount of less than about 20% by weight of the copolymer. Copolymers which include about 10% by weight or more of a hydrophilic monomeric component tend to form hydrogels if placed in an aqueous environment. The term "hydrophilic monomeric component" refers to compounds which produce hydrogel-forming homopolymers, that is homopolymers which become associated with at least 25% of water, based on the weight of the homopolymer, if placed in contact with an aqueous solution.

Specific examples of useful hydrophilic monomeric components include N-vinyl pyrrolidone; hydroxyalkyl(meth) acrylates such as 2-hydroxyethyl(meth)acrylate, 3-hydroxypropyl(meth)acrylate, 3-hydroxypropyl(meth)acrylate, 4-hydroxybutyl(meth)acrylate, 2,3-dihydroxypropyl(meth) acrylate and the like; acrylamide; N-alkyl acrylamides such as N-methyl acrylamide, N-ethyl acrylamide, N-propyl acrylamide, N-butyl acrylamide and the like; acrylic acid; methacrylic acid; and the like and any one mixture thereof.

The polymeric optical materials will likely include a crosslinking component that can form crosslinks with at least the first or the second monomeric components. Preferably, the crosslinking component is multi-functional and can chemically react with both the first and second monomeric components. The crosslinking component is often present in a minor amount relative to the amounts of the first and second monomeric components. Preferably, the crosslink component is present in the copolymer in an amount of less than about 1% by weight of the copolymer. Examples of useful crosslinking components include ethylene glycol dimethacrylate, propylene glycol dimethacrylate, ethylene glycol diacrylate and the like and mixtures thereof.

In one embodiment, the optical, polymeric materials can be prepared from one or more aromatic (meth)acrylate monomers having the formula:

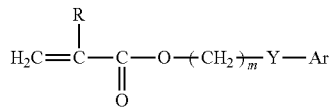

wherein: R is H or $CH_3$; m is an integer selected from 0 to 10; Y is nothing, O, S, or NR wherein R is H, $CH_3$, $C_2$-$C_6$alkyl, iso-$OC_3H_7$, phenyl or benzyl; Ar is any aromatic ring, e.g., phenyl, which can be unsubstituted or substituted with H, $CH_3$, $C_2H_5$, n-$C_3H_7$, iso-$C_3H_7$, $OCH_3$, $C_6H_{11}$, Cl, Br, phenyl or benzyl; and a crosslinking component.

Exemplary aromatic (meth)acrylate monomers include, but are not limited to: 2-ethylphenoxy(meth)acrylate, 2-ethylthiophenyl(meth)acrylate, 2-ethylaminophenyl(meth) acrylate, phenyl-(meth)acrylate, benzyl(meth)acrylate, 2-phenylethyl(meth)acrylate, 3-phenylpropyl-(meth)acrylate, 4-phenylbutyl(meth)acrylate, 4-methylphenyl(meth) acrylate, 4-methylbenzyl(meth)acrylate, 2-2-methylphenylethyl(meth)acrylate, 2-3-methylphenylethyl(meth)acrylate, 2-4-methylphenylethyl(meth)acrylate, 2-(4-propylphenyl) ethyl(meth)acrylate, 2-(4-(1-methylethyl)phenyl)ethyl methacrylate, 2-(4-methoxyphenyl)ethyl methacrylate and the like.

Generally, if the optical, polymeric material is prepared with both an aromatic acrylate and an aromatic methacrylate as defined by the formula above, the materials will generally comprise a greater mole percent of aryl acrylate ester residues than of aryl methacrylate ester residues. It is preferred that the aryl acrylate monomers constitute from about 60 mole percent to about 90 mole percent of the polymer, while the aryl methacrylate monomers constitute from about 5 mole percent to about 40 mole percent of the polymer. Most preferred is a polymer comprising about 60-70 mole percent 2-phenylethyl acrylate and about 30-40 mole percent 2-phenylethyl methacrylate.

In another embodiment, the optical, polymeric materials will have a fully hydrated (equilibrium) water content from 5% to 15% by weight, which also helps to minimize the degree of hazing following thermal stress as described as well as minimize the formation of water vacuoles in vivo. To achieve the desired water content applicants have discovered that one could include a hydrophilic, aromatic monomer having a formula, G-D-Ar, wherein Ar is a $C_6$-$C_{14}$ aromatic group with an optional hydrophilic substituent, particularly if D is not a poly(alkylene glycol), in the polymerizable compositions. D is a divalent linking group, and G is a polymerizable ethylenic site, One particular hydrophilic aromatic monomer is represented by formula

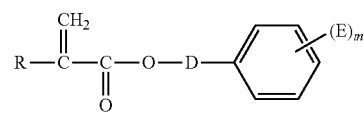

wherein R is hydrogen or $CH_3$; D is a divalent group selected from the group consisting of straight or branched $C_1$-$C_{10}$ hydrocarbons and poly(alkylene glycol), and E is selected from the group consisting of hydrogen, alkyl, carboxy, carboxamide, and monohydric and polyhydric alcohol substituents.

In another embodiment, the optical, polymeric material is prepared from a first aryl monomeric component, which is present in 5-25% by weight, the second monomeric component is 2-hydroxyethyl(meth)acrylate, which is present from 30 to 70% by weight; and 5 to 45% by weight of a another alkyl(meth)acrylate selected from the group consisting of methyl(meth)acrylate, ethyl(meth)acrylate, propyl(meth) acrylate, butyl(meth)acrylate, pentyl(meth)acrylate, hexyl meth)acrylate, heptyl(meth)acrylate, nonyl(meth)acrylate, stearyl meth)acrylate, octyl(meth)acrylate, decyl(meth)acrylate, lauryl(meth)acrylate, pentadecyl(meth)acrylate and 2-ethylhexyl(meth)acrylate. Among the alkyl(meth)acrylates those containing 1 to 3 carbon atoms of alkyl group are preferred.

Exemplary aryl monomeric components include ethylene glycol phenyl ether acrylate (EGPEA), poly(ethylene glycol phenyl ether acrylate) (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-2-methyphenylethyl methacrylate, 2-3-methylphenylethyl methacrylate, 2-4-methylphenylethyl methacrylate, 2-(4-propylphenyl) ethyl methacrylate, 2-(4-(1-methylethyl)pheny)ethyl methacrylate, 2-(4-methoxyphenyl)ethylmethacrylate, 2-(4-cyclohexylpheny)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-phenylphenyl)ethyl methacrylate), 2-(4-benzylphenyl)ethyl methacrylate, and the like, including the corresponding methacrylates and acrylates, and including mixtures thereof. EGPEA and polyEGPEA are two of the more preferred first monomeric components.

One particular hydrophilic, acrylic material of interest is based upon a commercially available IOL sold in the market by Bausch & Lomb under the tradename Akreos®. This acrylic material comprises about 80% by weight HEMA and 20 wt % MMA. This HEMA-hydrogel can absorb about 28% (by weight) water. Another hydrophilic acrylic of interest is referred to as HEMA B, which is a poly(2-hydroxyethyl methacrylate) cross-linked with about 0.9% (by weight) of ethylene glycol dimethacrylate ("EGDMA"). This HEMA-hydrogel can absorb about 37% (by weight) water.

Another optical polymer of interest is a substantially rigid polymer having a glass transition temperature of at least about normal room temperature. Each of the three different monomeric components is preferably present in the copolymer in an amount of at least 10 wt %, more preferably, at least 20 wt %. An exemplary optical polymer will comprises a hydratable copolymer which includes: a) at least 20 wt % of a first monomeric component such as ethylene glycol phenyl ether acrylate or polyethylene glycol phenyl ether acrylate; b) at least 10 wt % of a second monomeric component such as styrene or substituted styrene; c) at least 10 wt % of a third monomeric component such as hydroxy ethyl methacrylate, hydroxyethoxy ethyl methacrylate, or methacrylic acid; d) less than 8 weight percent of a crosslinking agent such as a diacrylate or a dimethacrylate, and e) 0.5 wt % to 2.0 wt % of a compound of formula I, II, III or IV.

Another acrylic polymer can comprise approximately 52 wt % to 56 wt % of a first alkyl acrylate, approximately 18 wt % to 22 wt % of a second alkyl acrylate, approximately 24 wt % to 28 wt % of a third alkyl acrylate, approximately 3 wt % to 5 wt % of a diacrylate ester crosslinking agent. The first alkyl acrylate, second alkyl acrylate and third alkyl acrylate are selected from the group including, but not limited to, phenoxyethyl acrylate, methacrylate, ethyl methacrylate, n-butyl acrylate, ethyl acrylate and 2-ethyl hexyl acrylate, providing that the first, second and third acrylates are each different from each other. A particular embodiment of the acrylic polymer will consist essentially of approximately 54 parts of phenoxyethyl acrylate, approximately 20 parts of ethyl acrylate, approximately 26 parts of ethyl methacrylate, approximately 4 parts of ethyleneglycol dimethacrylate and 0.5 to 1.5 parts of the described compounds of formula I, II, III or IV.

The optical, polymeric material can also be prepared by copolymerizing a specific monomer mixture comprising perfluorooctylethyloxypropylene(meth)acrylate, 2-phenylethyl (meth)acrylate, an alkyl(meth)acrylate monomer having the following general formula,

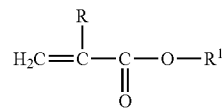

wherein R is hydrogen or methyl and $R^1$ is a linear or branched $C_4$-$C_{12}$ alkyl group, and a crosslinking monomer. An exemplary list of alkyl(meth)acrylate monomer include n-butyl acrylate, isobutyl acrylate, isoamyl acrylate, hexyl acrylate, 2-ethylhexyl acrylate, octyl acrylate, isooctyl acrylate, decyl acrylate, isodecyl acrylate, and the like.

The perfluorooctylethyloxypropylene(meth)acrylate is present from 5% to 20% by weight, the 2-phenylethyl(meth) acrylate is present from 40% to 60% by weight, the alkyl (meth)acrylate monomer is present from 30% to 50% by weight and the crosslinking agent is present from 0.5% to 4% by weight.

As stated, the optical polymer will likely include a crosslinking agent. The copolymerizable crosslinking agent(s) useful in forming the copolymeric material of the invention include any terminally ethylenically unsaturated compound having more than one unsaturated group. Preferably, the crosslinking agent includes a diacrylate or a dimethacrylate.

The optical, polymeric materials are prepared by generally conventional polymerization methods from the respective monomeric components. A polymerization mixture of the monomers in the selected amounts is prepared and a conventional thermal free-radical initiator is added. The mixture is introduced into a mold of suitable shape to form the optical material and the polymerization initiated by gentle heating. Typical thermal, free radical initiators include peroxides, such as benzophenone peroxide, peroxycarbonates, such as bis-(4-t-butulcyclohexyl) peroxydicarbonate, azonitriles, such as azobisisobytyronitrile, and the like. A preferred initiator is bis-(4-t-butylcyclohexyl) peroxydicarbonate (PERK). Alternatively, the monomers can be photopolymerized by using a mold which is transparent to actinic radiation of a wavelength capable of initiating polymerization of these acrylic monomers by itself. Conventional photoinitiator compounds, e.g., a benzophenone-type photoinitiator, can also be introduced to facilitate the polymerization.

EXAMPLES

Preparation of Examples 4 and 5

Scheme 1

The preparation of 5-chloro-1,3-dihydroxyacridone (compound 3) and it's methacryloyl derivatives (compounds 4 and 5) as shown is Scheme 1 below. Compound 3 was synthesized following a literature protocol (*J. Med. Chem.* 2003, 46, 5015-5020). Mono- and di-acylation of compound 3 afforded compound 4 and compound 5, respectively.

Scheme 1:

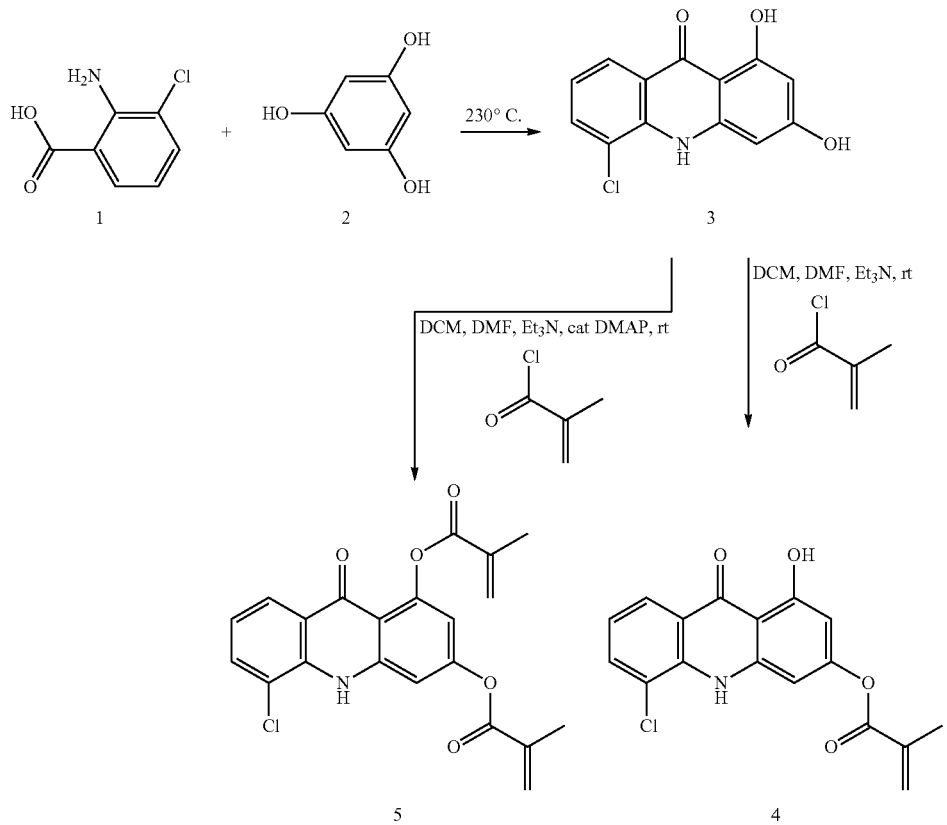

Preparation of Compound 3.

A 250-mL sealed reactor was charged with 2-amino-3-chlorobenzoic acid (8.58 g, 50 mmol, and 1,3,5-trihydroxybenzene (110 mg, 1.0 mmol). The mixture was then heated to 230° C. for 40 min. The solids melted after ~10 minutes and stayed as liquid for ~1 minute before solidifying again. The mixture was cooled to room temperature and acetone (600 mL) was used to break the solids and transferred to a 1-L Erlenmeyer flask. The slurry was stirred for 30 minutes with periodic breaking of the solid with a spatula². The solid was filtered and washed with acetone (200 mL), affording a dark yellow to brown powder. The powder was then triturated in hot methanol (1.5 L) at 60° C. for 30 minutes and filtered after the slurry cooled to ~30° C. and washed with methanol (200 mL) to afford the product 3 (4.87 g, 37%) as yellow solid. $^1$H NMR (DMSO-$d_6$): 6.06 (1H, d, J=2.3), 6.81 (1H, d, J=2.0), 7.23 (1H, t, J=8.1), 7.87 (1H, d, J=7.3), 8.11 (1H, d, J=7.3), 10.64 (1H, s), 10.97 (1H, s): LC-MS: m/z+1=262.1.

Example 4

A 50-mL round bottom flask was charged with compound 3 (0.5 g, 1.9 mmol) and dissolved in anhydrous N,N-dimethylformamide (5 mL) and anhydrous dichloromethane (5 mL). Triethylamine (0.3 g, 2.9 mmol, 1.5 equiv) was added followed by methacryloyl chloride (0.24 g, 2.3 mmol, 1.2 equiv). The mixture was stirred at room temperature under nitrogen for 15 hours. TLC analysis indicated the reaction was complete. The mixture was diluted with dichloromethane (50 mL) and washed with water (100 mL). The organic phase was separated, dried with anhydrous magnesium sulfate, filtered and concentrated under reduced vacuum. The residue was purified by silica gel column (30-50% ethyl acetate/hexanes) to afford the product as a yellow solid, which was triturated with 1:1 ethyl acetate/hexanes (100 mL), filtered and dried (167 mg, 27%). $^1$H NMR (DMSO-$d_6$): 2.01 (3H, s), 5.95 (1H, s), 6.32 (1H, s), 6.48 (1H, dd, J=0.9, 1.4), 7.30 (2H, m), 7.96 (1H, m), 8.21 (1H, m), 11.35 (1H, s). LC-MS: m/z+1=330.3. The transmission spectrum of Example 4 in methylene chloride at 100 microns is shown in FIG. 1.

Example 5

A 50-mL round bottom flask was charged with compound 3 (0.5 g, 1.9 mmol, and dissolved in anhydrous N,N-dimethylformamide (5 mL) and anhydrous dichloromethane (5 mL). Triethylamine (0.58 g, 5.73 mmol, 3 equiv) and catalytic dimethylaminopyridine (10 mg) were added followed by methacryloyl chloride (0.44 g, 4.2 mmol, 2.2 equiv). The mixture was stirred at room temperature under nitrogen for 15 hours. TLC analysis indicated the reaction was complete. The mixture was diluted with dichloromethane (50 mL) and washed with water (100 mL). The organic phase was separated, dried with anhydrous magnesium sulfate, filtered and concentrated under reduced vacuum. The residue was purified by silica gel column (30-50% ethyl acetate/hexanes) to afford the product as pale yellow solid, which was triturated with 1:1 ethyl acetate/hexanes (100 mL), filtered and dried (390 mg, 51%). $^1$H NMR (DMSO-$d_6$): 2.02 (3H, s), 2.06 (3H, s), 5.93 (2H, dd, J=0.9, 27.3), 6.29 (2H, d, J=26.1), 6.95 (1H, d, J=2.1), 7.24 (1H, t, J=7.5), 7.88 (2H, m), 8.10 (1H, dd, J=1.2, 8.1), 11.35 (1H, s) (see Attachment 5). LC-MS: m/z+1=397.8.

Preparation of Example 8

Scheme 2

A procedure similar to that of Example 4 is used with the exception that 2-amino-3-methylbenzoic acid is substituted for Compound 1 as shown in Scheme 2.

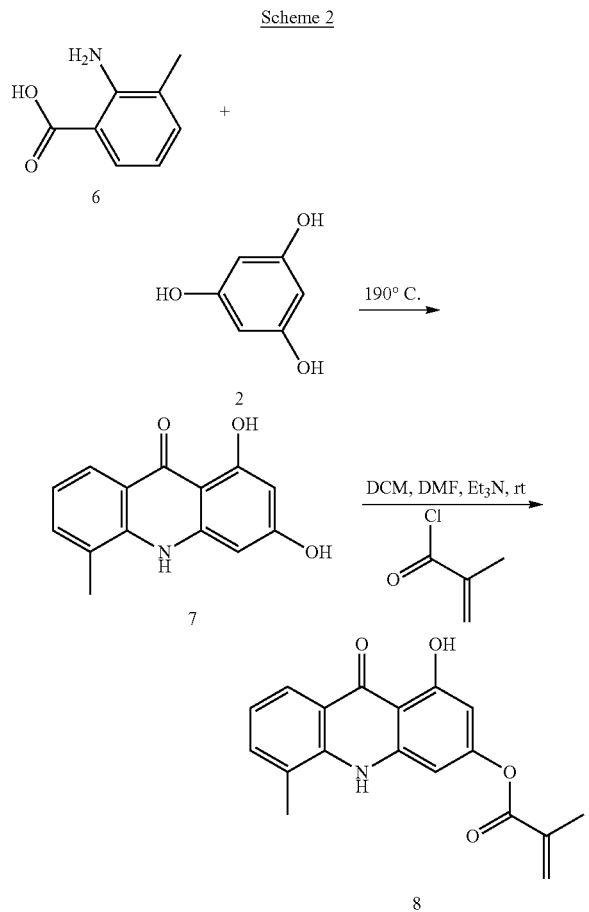

Preparation of Compound 7.

A 250-mL sealed reactor was charged with 2-amino-3-methylbenzoic acid (6) (7.56 g, 50 mmol, 1 equiv) and 1,3,5-trihydroxybenzene (2) (7.57 g, 60 mmol, 1.2 equiv). The mixture was then heated to 190° C. for 40 min. The solids melted after ~10 minutes and stayed as liquid for ~2 minute before solidifying again. The mixture was cooled to room temperature and acetone (300 mL) was used to break the solids in a mortar and pestle and transferred to a 1-L Erlemeyer flask. The slurry was stirred for 30 minutes. The solid was filtered and washed with acetone (50 mL), affording the product 7 (2.6 g, 22%) as dark yellow to brown powder.

Example 8

A 250-mL three neck round bottom flask was charged with compound 7 (4.82 g, 20 mmol, 1 equiv) and dissolved in anhydrous N,N-dimethylformamide (30 mL) and anhydrous dichloromethane (30 mL). The mixture was cooled to 0° C. and triethylamine (3 g, 30 mmol, 1.5 equiv) added. Methacryloyl chloride (2.1 g, 20 mmol, 1 equiv) was added maintaining the temperature <5° C. The mixture was stirred at room temperature under nitrogen for 12 hours. TLC analysis indicated the reaction was complete. The mixture was diluted with dichloromethane (100 mL) and washed with water (100 mL). The organic phase was separated, dried with anhydrous magnesium sulfate, filtered and concentrated under reduced vacuum. The residue was purified by silica gel column (20-30% ethyl acetate/hexanes) to afford the product as yellow solid, which was triturated with 1:4 ethyl acetate/hexanes (100 mL), filtered and dried to yield 1.9 g of the product. Additional 115 mg of the product was isolated from the filtrate after concentration and reslurry from EtOAc/hexanes. Total yield: 2.01 g (33%).

Preparation of Example 15

Scheme 3

Preparation of Compound 11.

A 250-mL three neck flask was charged with alcohol 10 (10 g, 139 mmol, 1 equiv), dichloromethane (100 mL, 10 vol) and triethylamine (21 g, 208 mmol, 1.5 equiv) then cooled to 5° C. Trimethylacetyl chloride (17.4 g, 167 mmol, 1.2 equiv) was added dropwise maintaining the temperature <10° C. The mixture was stirred at room temperature for 5 hours and TLC analysis indicated the reaction is complete. The mixture was diluted with water (200 mL) and extracted with dichloromethane (2×100 mL). The organic layers were combined, dried over anhydrous MgSO$_4$, filtered and concentrated. A quick silica gel plug column using 10-20% EtOAc/hexanes afforded the pure product 11 as colorless oil (Yield: 18.1 g$^1$).

Preparation of Compound 12.

A 100-mL three neck flask was charged with compound 11 (6.24 g, 40 mmol, 1 equiv) and dichloromethane (20 mL, 3 vol). A solution of Br$_2$BH.SMe$_2$ (40 mL, 1 M in DCM, 40 mmol) was added dropwise maintaining the temperature <30° C. The mixture was stirred at room temperature for 17 hours. The mixture cooled to 0° C. and quenched with water (7.5 mL) then diluted with MTBE (25 mL). The mixture was stirred for 30 minutes and the aqueous layer separated, which was extracted with MTBE once (50 mL). The organic layers were combined, dried over anhydrous MgSO$_4$, filtered and concentrated. The residue was dissolved in MTBE (100 mL) and KHF$_2$ (8.7 g, 111 mmol) added, followed by water (35 mL) over a period of 30 minutes. The mixture was stirred for 3 h, then concentrated. The crude compound was dissolved in acetone (100 mL), filtered, and concentrated. The resulting white solid was purified by dissolving in hot acetone and precipitating with MTBE, affording product 12 as white solid (4.5 g, 43%).

Preparation of Compound 9.

A 250-mL three neck flask was charged with compound 7 (2 g, 8.3 mmol, 1 equiv), dichloromethane (50 mL, 25 vol), triethylamine (12 mL) and DMAP (2.02 g, 16.6 mmol, 2 equiv) then cooled to 5° C. Triflic anhydride (2.58 g, 9.1 mmol, 1.1 equiv) was added dropwise and the mixture stirred at room temperature for 12 hours. TLC analysis indicated the reaction is complete. The mixture was diluted with water (200 mL) and extracted with dichloromethane (2×100 mL). The organic layers were combined, dried over anhydrous MgSO$_4$, filtered and concentrated. Silica gel column using 10-30% EtOAc/hexanes afforded pure product 9 as yellow solid after reslurry from EtOAc/hexanes (Yield: 1.3 g, 43%).

Preparation of Compound 13.

A 100-mL sealed tube was charged with compound 9 (0.9 g, 2.41 mmol, 1 equiv), compound 12 (0.7 g, 2.65 mmol, 1.1 equiv), cesium carbonate (2.36 g, 7.23 mmol, 3 equiv), anhydrous tetrahydrofuran (25 mL) and water (2.5 mL). The mixture was spurged with nitrogen for 2 minutes and Pd(dppf) (351 mg, 0.48 mmol, 20 mol %) was added. The mixture was spurged again for 2 minutes and sealed then heated at 110° C. for 5 hours. The mixture was cooled to room temperature and filtered through a pad of celite with ethyl acetate washings. The filtrate was diluted with ethyl acetate (100 mL) and washed with water (100 mL). The organic layer was separated, dried over anhydrous MgSO$_4$, filtered and concentrated. Silica gel column using 10-30% EtOAc/hexanes afforded pure product 13 as brown oil (Yield: 0.24 g, 26%).

Preparation of Compound 14.

A 100-mL three neck round bottom flask was charged with compound 13 (0.24 g, 0.63 mmol, 1 equiv) and THF (10 mL) then cooled to 5° C. Vitride (65 wt % Red-Al or sodium bis(2-methoxyethoxy)aluminum hydride solution in toluene, 0.39 g, 2 equiv) was added dropwise. The mixture was stirred at room temperature for 4 hours and TLC analysis indicated the reaction is complete. The reaction was quenched carefully by dropwise addition of 1 mL saturated sodium sulfate solution. The clear solution was decanted and concentrated under reduced pressure. Silica gel column using 20-50% EtOAc/hexanes afforded pure product 14 as yellow oil (Yield: 60 mg, 32%).

Example 15

A 100-mL three neck round bottom flask was charged with compound 14 (60 mg, 0.2 mmol, 1 equiv) and dissolved in anhydrous dichloromethane (20 mL). The mixture was cooled to 0° C. and triethylamine (30 mg, 0.3 mmol, 1.5 equiv) added. Methacryloyl chloride (25 mg, 0.24 mmol, 1.2 equiv) was added maintaining the temperature <5° C. The mixture was stirred at room temperature under nitrogen for 12 hours. TLC analysis indicated the reaction was complete. The mixture was washed with water (20 mL). The organic phase was separated, dried with anhydrous magnesium sulfate, filtered and concentrated under reduced vacuum. The residue was purified by silica gel column (10-30% ethyl acetate/hexanes) to afford the product as yellow solid (50 mg, 68%).

Preparation of Example 19

Scheme 4

Preparation of Compound 16.

A 250-mL three neck flask was charged with compound 3 (2 g, 7.6 mmol, 1 equiv), dichloromethane (50 mL, 25 vol), triethylamine (12 mL) and DMAP (1.84 g, 15.2 mmol, 2 equiv) then cooled to 5° C. Triflic anhydride (2.36 g, 8.4 mmol, 1.1 equiv) was added dropwise and the mixture stirred at room temperature for 12 hours. TLC analysis indicated the reaction is complete. The mixture was diluted with water (200 mL) and extracted with dichloromethane (2×100 mL). The organic layers were combined, dried over anhydrous MgSO$_4$, filtered and concentrated. Silica gel column using 10-30% EtOAc/hexanes afforded pure product 16 as yellow solid after reslurry from EtOAc/hexanes (Yield: 1.6 g, 53%).

Preparation of Compound 17.

A 100-mL sealed tube was charged with compound 16 (1.3 g, 3.3 mmol, 1 equiv), compound 12 (1.05 g, 3.96 mmol, 1.1 equiv), cesium carbonate (3.2 g, 9.9 mmol, 3 equiv), anhydrous tetrahydrofuran (25 mL) and water (2.5 mL). The mixture was spurged with nitrogen for 2 minutes and Pd(dppf) (483 mg, 0.66 mmol, 20 mol %) was added. The mixture was spurged again for 2 minutes and sealed then heated at 110° C. for 5 hours. The mixture was cooled to room temperature and filtered through a pad of celite with ethyl acetate washings. The filtrate was diluted with ethyl acetate (100 mL) and washed with water (100 mL). The organic layer was separated, dried over anhydrous MgSO$_4$, filtered and concentrated. Silica gel column using 10-30% EtOAc/hexanes afforded pure product 17 as brown oil (Yield: 0.42 g, 32%).

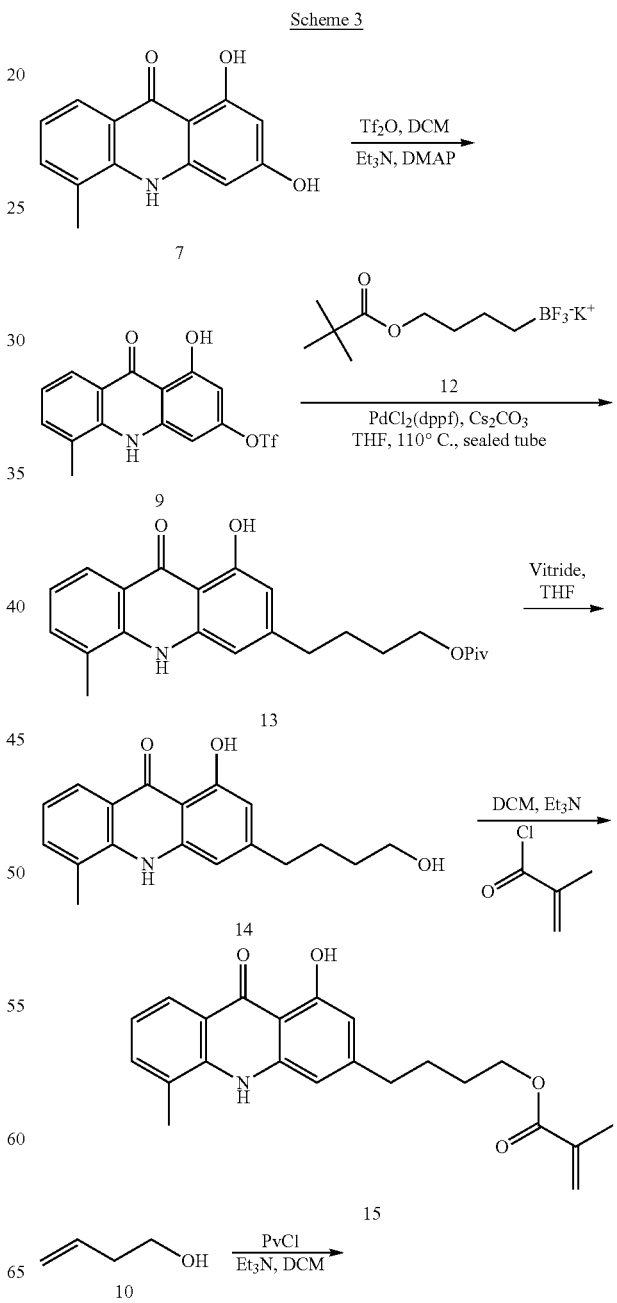

Scheme 3

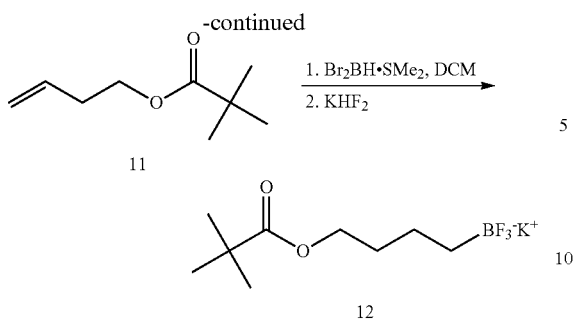

Preparation of Compound 18.

A 100-mL three neck round bottom flask was charged with compound 17 (0.32 g, 0.8 mmol, 1 equiv) and THF (10 mL) then cooled to 5° C. Vitride (65 wt % Red-Al or sodium bis(2-methoxyethoxy)aluminum hydride solution in toluene, 0.5 g, 1.6 equiv, 2 equiv) was added dropwise. The mixture was stirred at room temperature for 4 hours and TLC analysis indicated the reaction is complete. The reaction was quenched carefully by dropwise addition of 1 mL saturated sodium sulfate solution. The clear solution was decanted and concentrated under reduced pressure. Silica gel column using 20-50% EtOAc/hexanes afforded pure product 18 as yellow oil (Yield: 120 mg, 48%).

Example 19

A 100-mL three neck round bottom flask was charged with compound 18 (115 mg, 0.36 mmol, 1 equiv) and dissolved in anhydrous dichloromethane (10 mL) and DMF (5 mL). The mixture was cooled to 0° C. and triethylamine (55 mg, 0.54 mmol, 1.5 equiv) added. Methacryloyl chloride (45 mg, 0.43 mmol, 1.2 equiv) was added maintaining the temperature <5° C. The mixture was stirred at room temperature under nitrogen for 12 hours. TLC analysis indicated the reaction was complete. The mixture was diluted with ethyl acetate (30 mL) and washed with water (20 mL). The organic phase was separated, dried with anhydrous magnesium sulfate, filtered and concentrated under reduced vacuum. The residue was purified by silica gel column (10-30% ethyl acetate/hexanes) to afford the product as yellow solid (35 mg, 25%) after trituration from ethyl acetate/hexanes.

Example 20

A monomer mixture was prepared by mixing the following components,
N-vinyl-2-pyrrolidone (NVP) (90 weight percent); 4-t-butyl-2-hydroxycyclohexyl methacrylate (TBE) (10 weight percent), Pluronics®F127 dimethacrylate (5 weight percent), ethylene glycol dimethacrylate (EGDMA) (0.15 weight percent), allyl methacrylate (AMA) (0.15 weight percent) and 2-hydroxypropylmethacrylate (HEMA) (2 weight percent), Example 4 (2.0 weight percent) and a Vazo 64 initiator (0.5 weight percent). The monomeric mixture was cast in a polypropylene contact lens mold and thermally cured for about 4 hours (see below). The resulting contact lens had an equilibrium water content (EWC) of approximately 79 wt. %, and a Dk of 45.

Curing Conditions.

Formulations were made by adding Example 4 to a monomer mix in the stated amounts. Mixes were stirred overnight, then filtered through a 0.45 m filter. The lenses were hand cast in a dry air environment by pipetting 22 µl of mix into the anterior polypropylene molds and placing the posterior mold on top.

Lenses were cured according to the following procedure:
1) 3 hr purge at 25° C.
2) Ramp to 45° C. at 10 degrees/min
3) Hold at 45° C. for 3 hr
4) Ramp to 93° C. at 1 degree/min
5) Hold at 93° C. for 30 min
6) Ramp to 110° C. at 1 degree/min
7) Hold at 110° C. for 2 hr
8) Cool to 25° at 1 degree/min

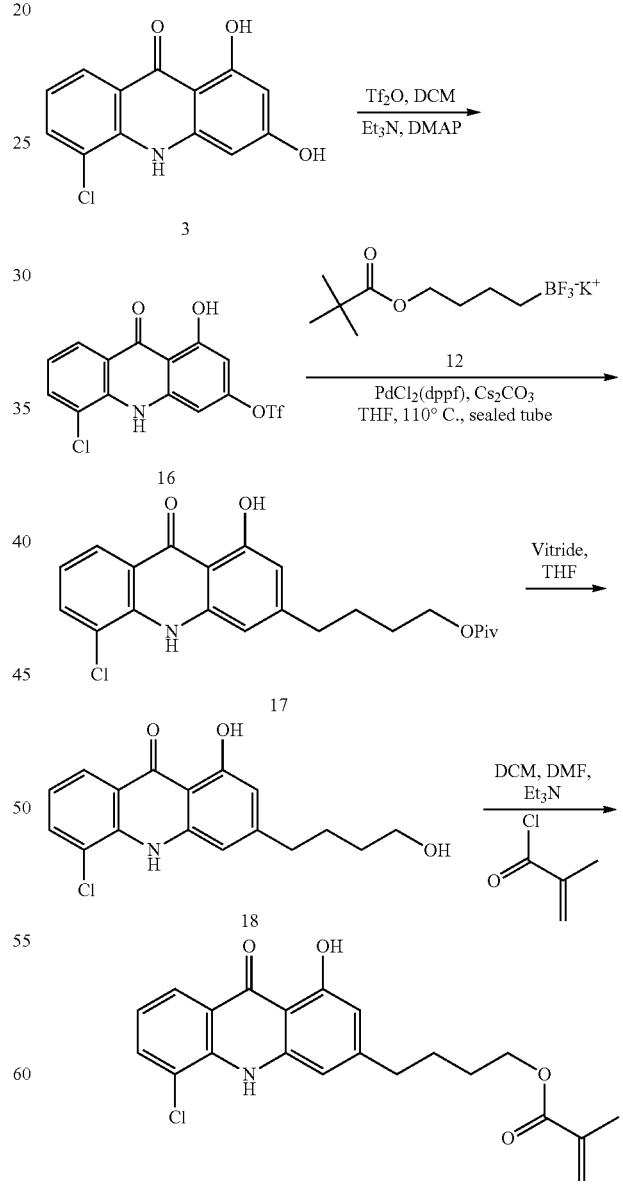

Scheme 4

Preparation of isomers of Compound 3.

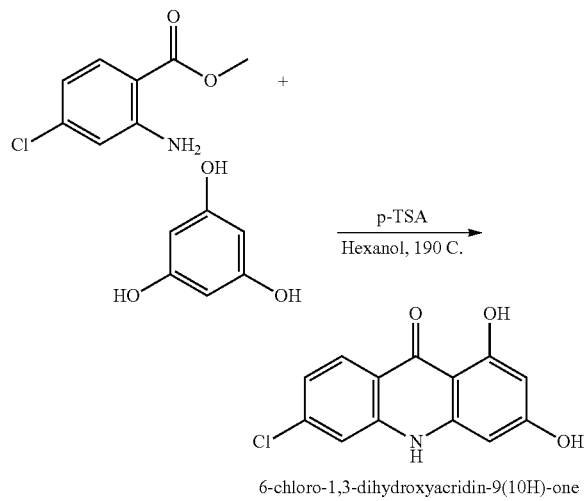

Scheme 5.

6-chloro-1,3-dihydroxyacridin-9(10H)-one

After curing, lenses were dry released and extracted in DI water (10 ml/lens) at room temperature overnight. They were then placed in a vial with 4 ml of borate buffered saline, sealed with a crimp cap and sterilized by one autoclave cycle.

Example 21

The same procedure and monomer mixture of Example 20 with the exception that the monomer mixture contained Example 4 at a concentration of 1.0 weight percent. The resulting contact lens had an equilibrium water content (EWC) of approximately 79 wt. %, and a Dk of 46.

Example 22

The same procedure and monomer mixture of Example 20 with the exception that the monomer mixture contained Example 4 at a concentration of 0.5 weight percent. The resulting contact lens had an equilibrium water content (EWC) of approximately 81 wt. %, and a Dk of 48.

Example 23

A monomer mixture was prepared by mixing the following components, N-vinyl-2-pyrrolidone (NVP) (90 weight percent); 4-t-butyl-2-hydroxycyclohexyl methacrylate (TBE) (10 weight percent), Pluronics® F127 dimethacrylate (5 weight percent), ethylene glycol dimethacrylate (EGDMA) (0.15 weight percent), allyl methacrylate (AMA) (0.15 weight percent) and 2-hydroxypropylmethacrylate (HEMA) (2 weight percent), Example 4 (2.0 weight percent), SA-benzotriazole (2.0 weight percent), and a Vazo 64 initiator (0.5 weight percent). The monomeric mixture was cast in a polypropylene contact lens mold and thermally cured for about 4 hours. The resulting contact lens had an equilibrium water content (EWC) of approximately 76 wt. %, and a Dk of 44.

Example 24

The same procedure and monomer mixture of Example 23 with the exception that the monomer mixture contained Example 4 at a concentration of 2.0 weight percent and SA-benzotriazole at 3.0 weight percent. The resulting contact lens had an equilibrium water content (EWC) of approximately 76 wt. %, and a Dk of 44.

Preparation of an Intraocular Lens

Example 25

A 30 g monomer mixture with the listed components of Table 4 was prepared and the mixture was stirred until uniform.

TABLE 4

|  | Actual Mass | Wt. % |
| --- | --- | --- |
| HEMA | 25.6028 g | 85.72 |
| MMA | 4.1545 g | 13.91 |
| EGDMA | 0.0169 g | 0.06 |
| Vazo 64 | 0.0336 g | 0.11 |
|  | 29.8688 g | 99.8% |

Silanized glass plates, with the dimensions of 83 mm by 100 mm, were assembled using Teflon tape as a gasket to control the cured film thickness to 0.5 mm and 1.0 mm. The outer edges of the assembled glass plates were then sealed with an RTV silicone and allowed to cure. The assembled glass plates were filled with the monomer mix using a syringe and hypodermic needle, the needle was left protruding out of the top of the assembly to act as a vent during the cure cycle. Several binder clips were used to hold the assembly together during the cure. The following cure conditions were used with a Forced Air Oven: 55° C., 1 hr; 65° C., 1 hr; 75° C., 1 hr; and 110° C., 1 hr. The molds were allowed to cool while still in the oven. The molds were then disassembled.

Figure 5:
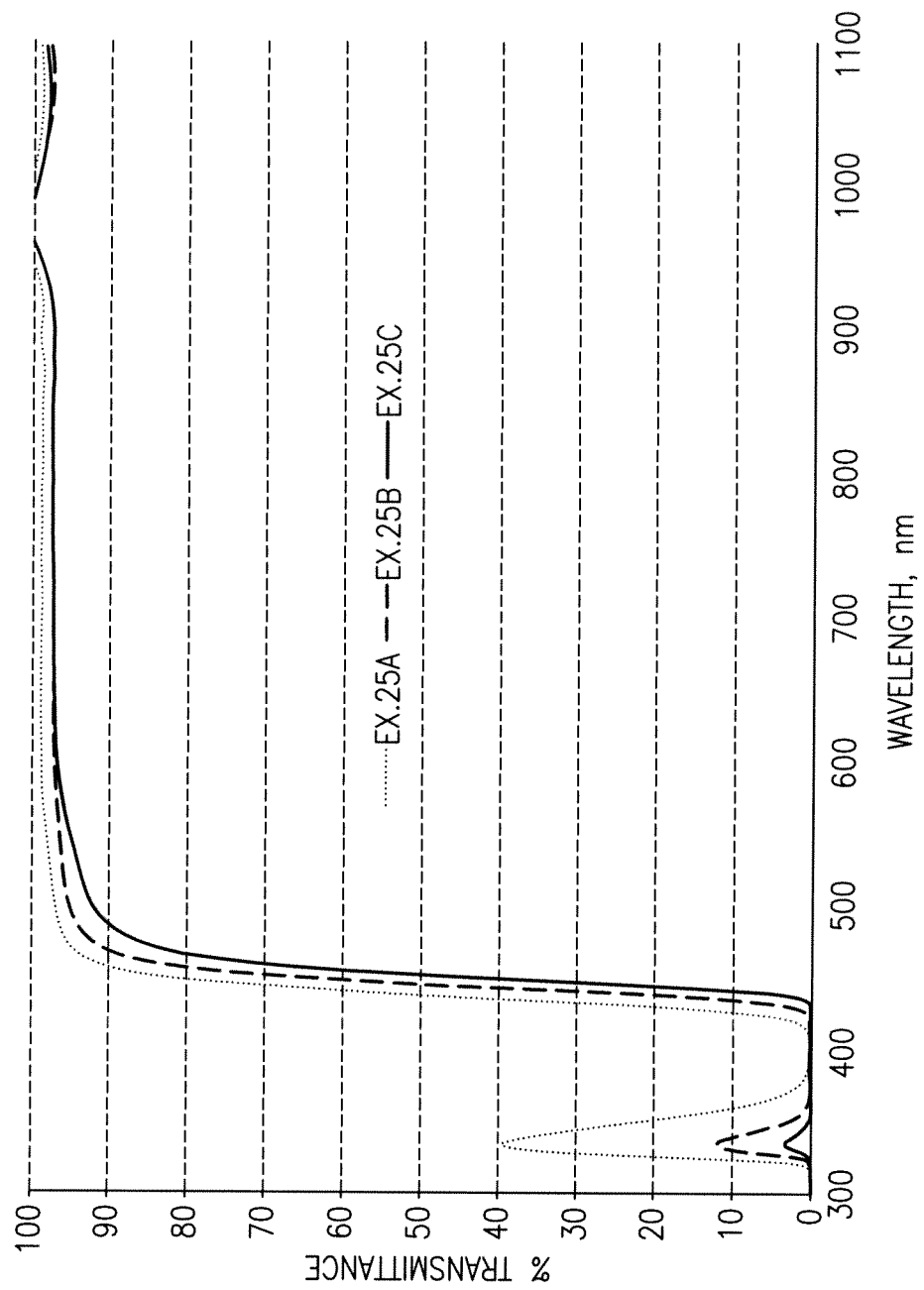
FIG. 5 shows the transmission spectra of a hydrophobic acrylic polymer with various concentrations of Example 4: Example 25a, 0.3 wt. %; Example 25b, 0.5 wt. %, and Example 25c, 1.0 wt. %.

To the mixture of Table 4 was added the following concentrations of Example 4: 0.3 wt. %, Example 25a; 0.5 wt. %, Example 25b; and 1.0 wt. %, Example 25c. The transmission spectra are shown in FIG. 5.

To obtain the transmission spectra of the cured materials five 8×8-mm squares were cut from each film. Each specimen was weighed to 0.0001 g and measured for thickness with a micrometer. The specimens were subsequently hydrated in 5-mL of balanced salt solution (BSS) over the weekend. A UV/vis scan was obtained in air for each specimen in a hydrated state (300 to 1100 nm, 240 nm/min, slit=2 nm, smooth factor=4, data interval=0.1 nm) with a PerkinElmer Lambda 35 spectrometer equipped with a Labsphere RSA-PE-20 integrating sphere. A sample holder having a 3-mm-diameter aperture was used. The samples were sealed in serum vials with 5-mL fresh BSS and were autoclaved at 121° C. for 1 h and allowed to reach room temperature overnight. Transmission spectra were again conducted on the autoclaved films, and the films were again measured for thickness. The equilibrium water content (EWC) of each specimen was determined from its initial and post-autoclave hydrated mass by:

EWC(%)=[(Hydrated Mass−Initial Mass)/Hydrated Mass]×100

The films showed excellent transparency without any obvious haze in both dry and hydrated states. The average thicknesses of the dry, as-cast specimens were 0.47±0.01 mm and 0.89±0.01 mm respectively. After autoclaving in BSS, the average values were 0.51±0.03 mm and 0.97±0.01 mm. The average EWC of the thinner specimens was 24.9±0.7% and 25.7±0.1% for the thicker specimens. The overall average EWC for the 10 specimens was 25.3±0.6%.

The transmission spectra of the hydrated specimens before and after autoclave were obtained. By comparing the pre- and post-autoclave cutoff values, the data indicates that the incorporation of Example 4 is fairly resistant to hydrolysis, which is unexpected as one would typically expect a potentially labile phenolic ester linkage. A summary of the 10% cutoff values is tabulated below.

| Film Condition | Thickness ± S.D. | λ @ 10% T |
|---|---|---|
| Hydrated, pre-autoclave | ND | 421.4 ± 0.8 |
| Hydrated, post-autoclave | 0.51 ± 0.03 | 419.6 ± 0.9 |
| Hydrated, pre-autoclave | ND | 430.0 ± 0.1 |
| Hydrated, post-autoclave | 0.97 ± 0.01 | 429.5 ± 0.1 |

Example 26

A 40 g monomer mixture with the listed components of Table 5 was prepared and the mixture was stirred until uniform. Poly(EGPEA) is Poly(ethylene glycol phenyl ether acrylate).

TABLE 5

| | Actual Mass | Wt. % |
|---|---|---|
| PolyEGPEA | 15.9683 g | 39.90% |
| Styrene | 10.3255 g | 25.80% |
| HEMA | 11.9547 g | 29.87% |
| EGDMA | 1.612 g | 4.03% |
| Ex. 4 | 0.1162 g | 0.29% |
| Vazo 64 | 0.0394 g | 0.10% |
| | 40.0161 g | 100.00% |

Figure 6:
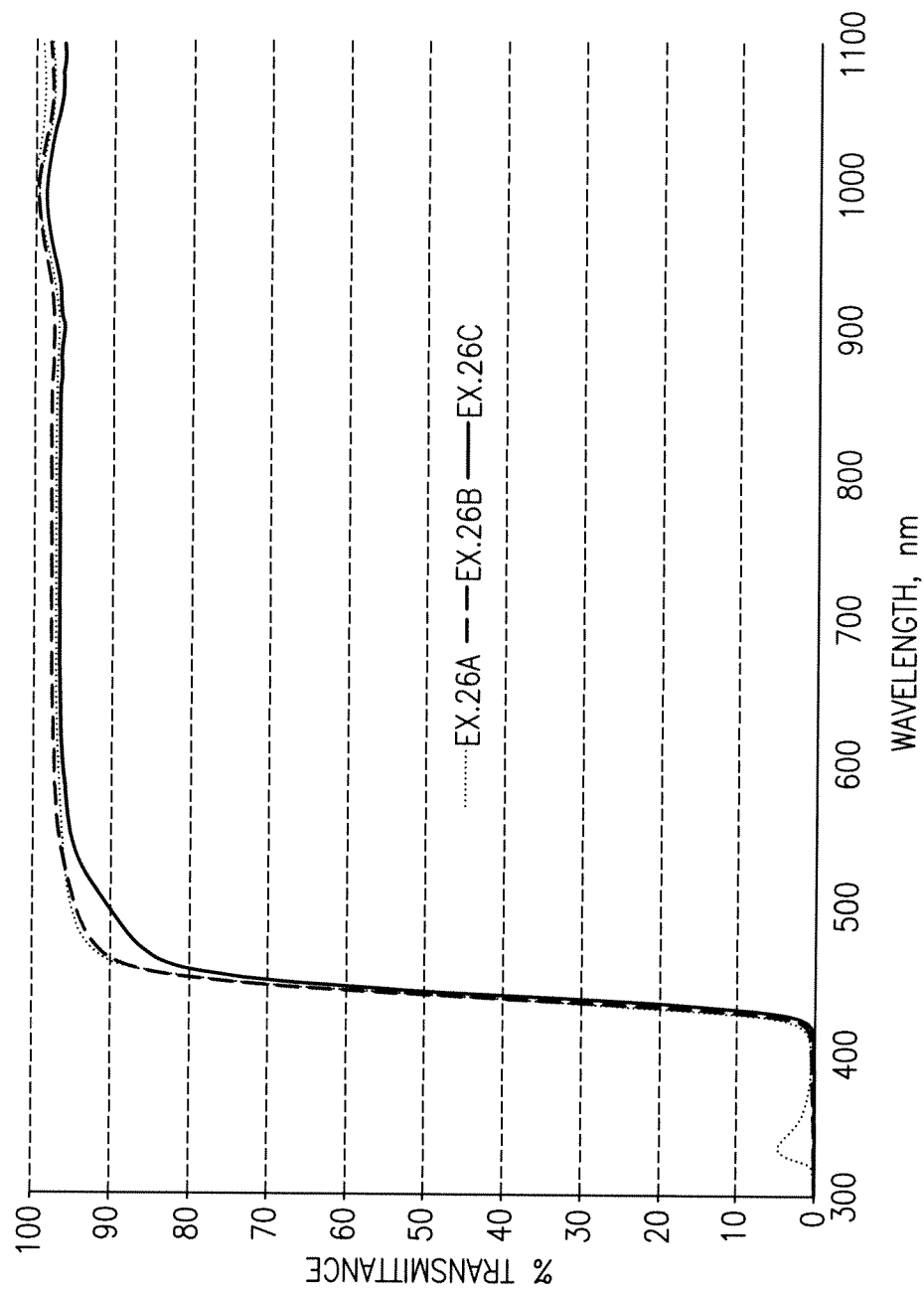
FIG. 6 shows the transmission spectra of a hydrophobic acrylic polymer with 0.25 wt. % of Example 4 and various concentrations of the benzotriazole UV-absorbing compound, X-monomer: Example 26a, 0.1 wt. %; Example 26b, 0.2 wt. %, and Example 26c, 0.5 wt. %.
Figure 7:
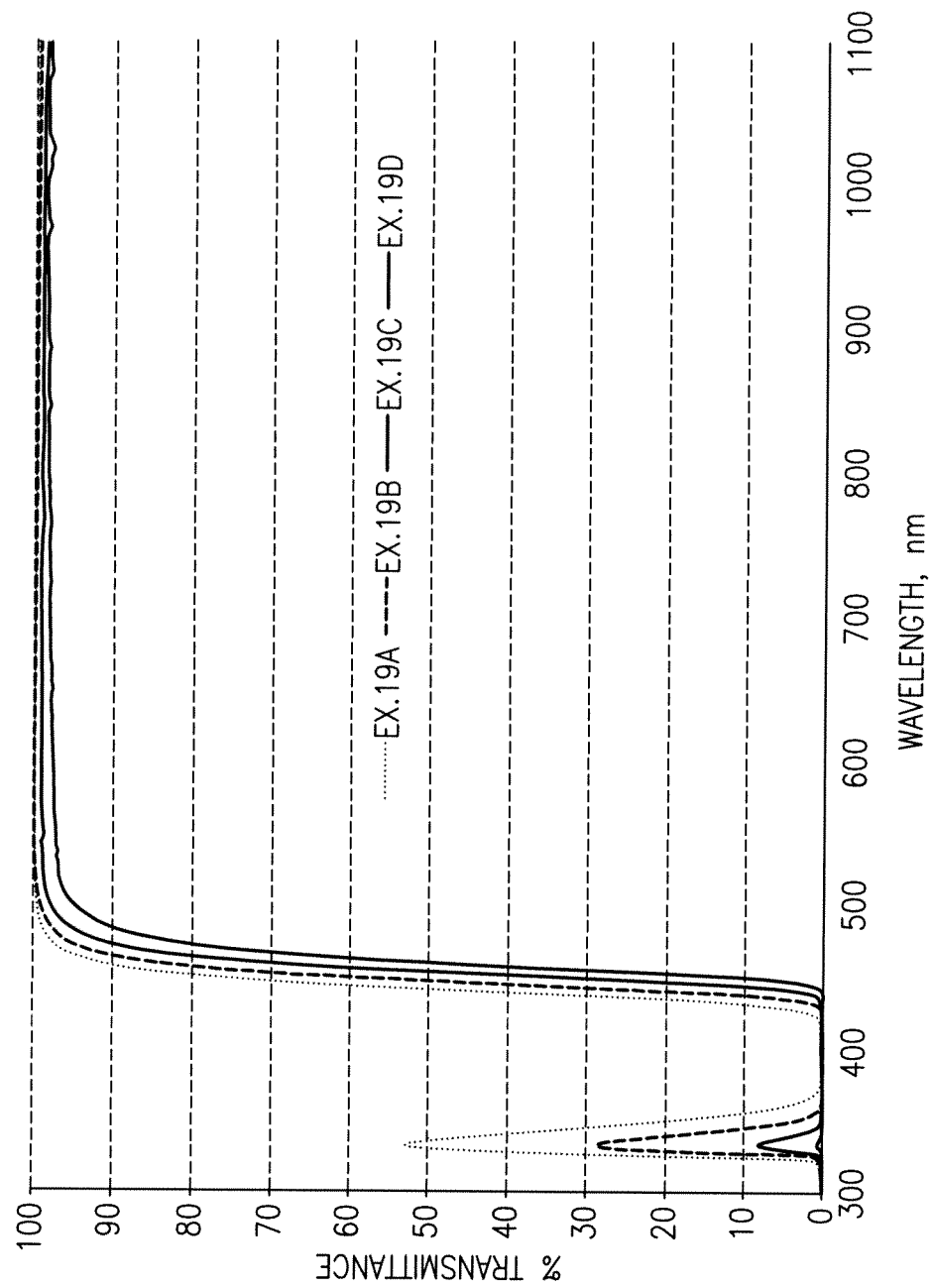
FIG. 7 shows the transmission spectrum of Example 19A, 19B, 19C and 19D at 0.25 wt. %, 0.5 wt. %, 1.0 wt. % and 2.0 wt. %, respectively, in methylene chloride at 100 microns.

To the mixture of Table 5 was added X-monomer: Example 26a, 0.1 wt. %; Example 26b, 0.25 wt. 5; and Example 26c, 0.5 wt. %. The transmission spectra for Examples 26a, 26b and 26c are shown in FIG. 6.

Silanized glass plates (83 mm by 100 mm) were assembled using Teflon tape as a gasket to control the cured film thickness to 0.5 mm and 1.0 mm. The outer edges of the assembled glass plates were then sealed with a RTV silicone and allowed to cure. The assembled glass plates were filled with the monomer mix using a syringe and hypodermic needle; the needle was left protruding out of the top of the assembly to act as a vent during the cure cycle. Several binder clips were used to hold the assembly together during the cure.

The following cure conditions follow: water bath at 50° C., 24 hr; water bath at 60° C., 24 hr; and vacuum oven at 90° C., 24 hr. The glass plates were disassembled and the curing continued with the following condition: vacuum oven at 150° C., 24 hr; vacuum oven at 70° C., 6 hr (Film Flattening Step).

Five 8-mm diameter disks were punched from each thickness of film. Each specimen was weighed to 0.0001-g and measured for thickness with a micrometer. The disks were then extracted with 1-propanol (2.5 h @ 50° C.) and dried overnight in vacuo at 95° C. UV/vis spectra in air were obtained. A UV/vis scan was obtained on the extracted and dried disks in air for each specimen (300 to 1100 nm, 240 nm/min, slit=2 nm, smooth factor=4, data interval=0.1 nm) with a PerkinElmer Lambda 35 spectrometer equipped with a Labsphere RSA-PE-20 integrating sphere. A sample holder having a 3-mm-diameter aperture was used. The specimens were subsequently hydrated in 5-mL of blood bank saline (BBS) overnight. Transmission spectra were again obtained in the hydrated (pre-gamma) state. The samples were sealed in acrylic vials with fresh BBS and were sterilized by gamma irradiation at FTSI (Mulberry, Fla.) with a delivered dose between 26.5 and 32.7 kGy. Transmission spectra were again obtained on the sterilized samples, and the films were again measured for thickness.

The films showed excellent transparency without any obvious haze in both dry and hydrated states. The average thicknesses of the dry, as-cast specimens were 0.47±0.01 mm and 0.93±0.01 mm respectively. After gamma irradiation in BBS, the average values were 0.47±0.01 mm and 0.91±0.01 mm. The 10% cutoff value was measured at 427 to 433 nm depending on thickness. Because Example 4 is soluble in 1-propanol, the transmission spectra indicate that the violet blocker is covalently bound into the polymer network. At this concentration (0.29%) there is a hole in the UV region around 330 nm. By comparing the pre- and post-sterilization cutoff values it can be seen that Example 4 is stable to gamma radiation. A summary of the 10% cutoff values is tabulated below.

| Film Condition | Thickness ± S.D. | λ @ 10% T |
|---|---|---|
| Hydrated, pre-gamma | ND | 427.0 ± 0.1 |
| Hydrated, post-gamma | 0.89 ± 0.01 | 426.9 ± 0.2 |
| Hydrated, pre-gamma | ND | 433.8 ± 0.1 |
| Hydrated, post-gamma | 0.91 ± 0.01 | 433.9 ± 0.1 |

Example 27

A monomer mix with the components listed as S5 in Table 3 was prepared using Vazo 64 as a thermal initiator. To this mixture was added 1.0 wt. % of Example 4. The following curing conditions were followed.

30 mins N2 purging

Ramp to 65 C @ 8 C/min

Hold @ 65 C for 19 min

Ramp to 93 C @ 2 C/min

Hold @ 93 C for 30 min

Ramp to 110 C @ 1 C/min

Hold @ 110 C for 59 min

Cool to 25 C @ 1.2 c/min.

Example 28

The same as Example 27 except that to the mixture was added 1.0 wt. % of Example 4 and 1.0 wt. % SA-monomer Comparative Example 1

Figure 4:
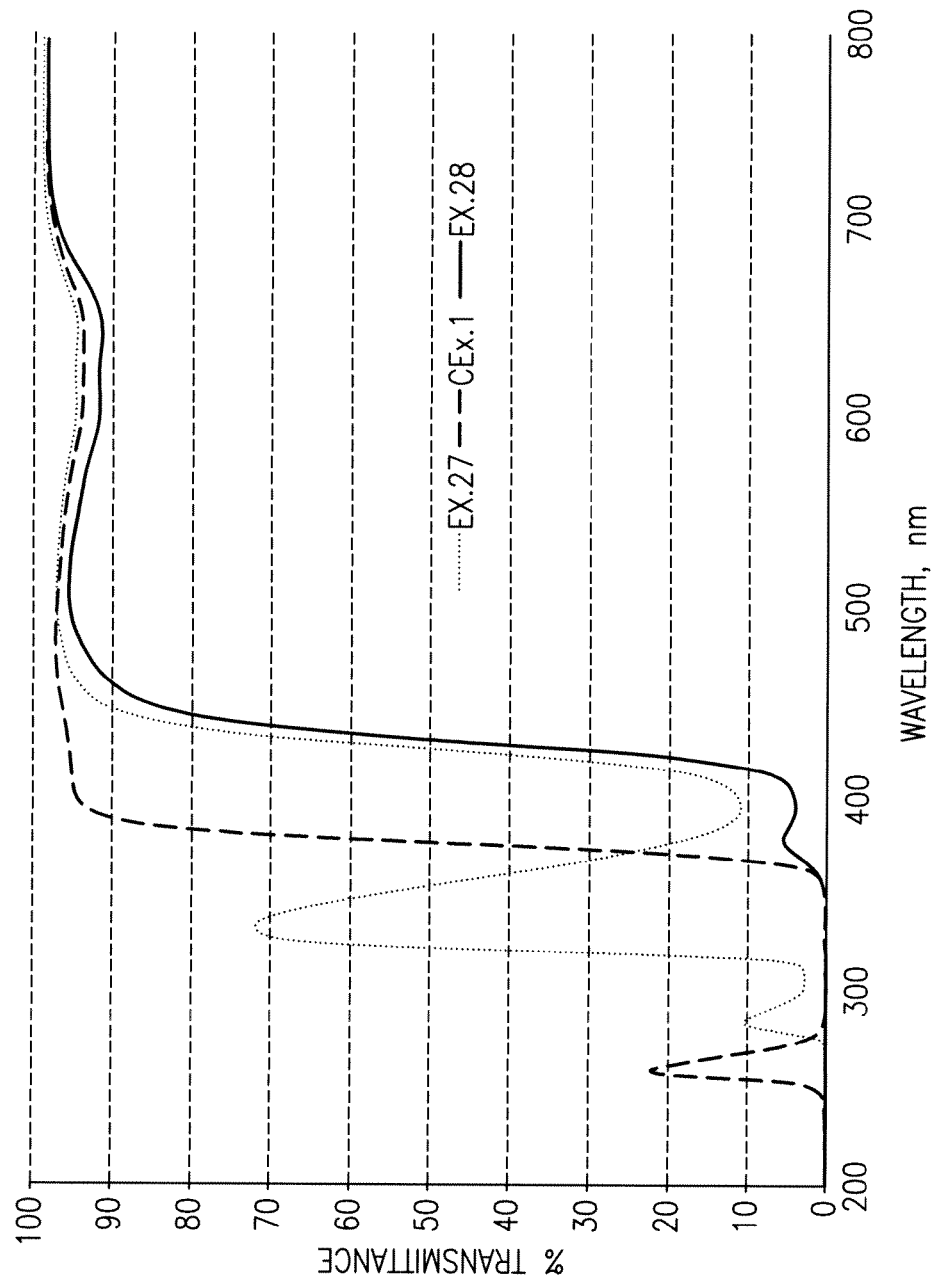
FIG. 4 shows the transmission spectra of a silicone hydrogel polymer with 1.0 wt. % Example 4, Example 27; the same hydrogel polymer with 2.0 wt % SA-monomer, Comparative Example 1; and the same hydrogel polymer with 1.0 wt % SA-monomer and 1.0 wt. % Example 4, Example 28.

The same as Example 27 except that to the mixture was added 2.0 wt. % SA-monomer The transmission spectra for Examples 27 and 28, and Comparative Example 1 is shown in FIG. 4.

The invention claimed is:

1. An optical polymer comprising: (a) monomeric units of one or more monomers suitable for producing optical polymeric materials and (b) monomeric units of a light-absorbing monomer having formula I

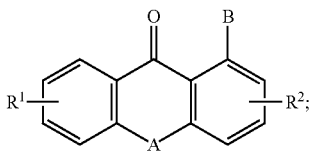

wherein A is NH or NR; B is OH, NH$_2$, or F; R$^1$ and R$^2$ are independently selected from the group consisting of H, Me, Et, i-propyl, t-butyl, F, Cl, Br, I, OH, OR, NH$_2$, NH$_3^+$, NHR, NR$_2$, NH$_2$R$^+$, NR$_3^+$, CN, C(O)OH, C(O)OR, C(O)R, Ar, OAr, SH, SR, S(O)OR, and D; wherein at least one of R$_1$ and R$_2$ is D; wherein Ar is an aromatic monovalent radical having 6-10 carbon atoms, and Ar comprises a single ring or a condensed ring system, optionally substituted; D is an aliphatic radical with twelve or fewer carbon atoms that includes an ethylenic polymerizable group and is optionally substituted with oxygen or nitrogen; and R is a C$_1$-C$_6$ alkyl.

2. The optical polymer of claim 1; wherein A is NH; and B is OH or NH$_2$.

3. The optical polymer of claim 1; wherein R$^1$ is H, Me, Cl or OR, and R$_2$ is D.

4. The optical polymer of claim 1; wherein D is defined by the following formula

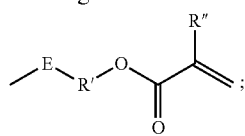

wherein R' is C$_2$-C$_8$ alkylene which may be straight chain or branched; E is O or nothing; and R" is H or CH$_3$.

5. The optical polymer of claim 1; wherein the monomeric units of the light-absorbing monomers are represented monomers having formula II

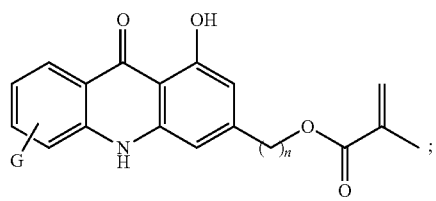

wherein G is H, Me, Cl or OR$^5$, R$^5$ is C$_1$-C$_4$ alkyl, and n is 0, 1, 2, 3, 4, 5 or 6.

6. The optical polymer of claim 1; wherein the monomeric units of the light-absorbing monomers are represented by monomers having the formula III

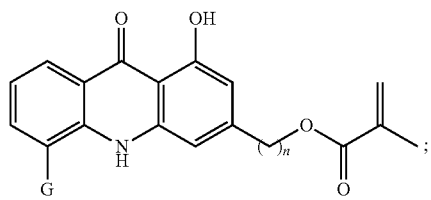

wherein G is H, Me, Cl or OR$^5$; R$^5$ is C$_1$-C$_4$ alkyl; and n is 0, 1, 2, 3, 4, 5 or 6.

7. The optical polymer of claim 1; wherein the monomeric units of the light-absorbing monomers are represented by monomers having the formula IV

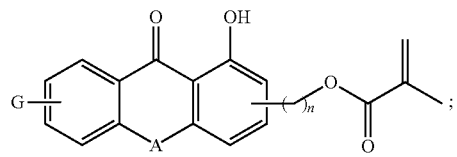

wherein A is NH or NR$^5$; G is H, Me, Et, i-propyl, t-butyl, Cl or OR$^5$; and R$^5$ is C$_1$-C$_4$ alkyl; and n is 0, 1, 2, 3, 4, 5 or 6.

8. The optical polymer of claim 1; wherein the monomeric units of formula I account for 0.1 wt % to 5 wt % of the polymer material.

9. The optical polymer of claim 1; wherein a one-millimeter thick sample of the polymer transmits less than 15% of light having wavelength of 420 nm, and more than 75% of light having wavelength of 450 nm therethrough.

10. The optical polymer of claim 1; wherein a one-millimeter thick sample of the polymer transmits less than 30% of light having wavelength of 420 nm, and more than 75% of light having wavelength of 450 nm therethrough.

11. The optical polymer of claim 1, further comprising monomeric units of a UV-absorbing compound other than the compounds of formula I.

12. The optical polymer of claim 11; wherein the UV-absorbing compound other than the compounds of formula I includes a benzotriazole chemical structure.

13. The optical polymer of claim 1, comprising hydrophilic monomeric units selected from the group consisting of: N-vinyl pyrrolidone, 2-hydroxyethyl methacrylate N, N-dimethyl acrylamide, acrylic acid, and methacrylic acid.

14. The optical polymer of claim 1, comprising monomeric units of styrene and 2-hydroxyethyl methacrylate, which together account for greater than 50% by weight of the polymer.

15. The optical polymer of claim 1, comprising monomeric units of N-vinyl-2-pyrrolidone, which accounts for greater than 80% by weight of the polymer.

16. An ophthalmic lens comprising the optical polymer material of claim 1; wherein the ophthalmic lens is a contact lens or an intraocular lens.

17. An optical polymer comprising: (a) monomeric units of one or more monomers suitable for producing optical polymeric materials, and (b) monomeric units of a light-absorbing monomer having formula IV

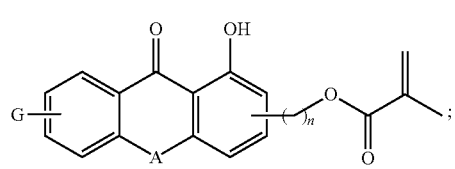

wherein A is NH or NR$^5$; G is H, C$_1$-C$_4$alkyl, Cl or OR$^5$, and R$^5$ is C$_1$-C$_4$ alkyl; and n is 0, 1, 2, 3, 4, 5 or 6.

18. The optical polymer of claim 17; wherein a one-millimeter thick sample of the polymer transmits less than 15% of light having wavelength of 420 nm, and more than 75% of light having wavelength of 450 nm, therethrough.

19. The optical polymer of claim 17, comprising hydrophilic monomeric units selected from the group consisting of: N-vinyl pyrrolidone, 2-hydroxyethyl methacrylate N,N-dimethyl acrylamide, acrylic acid, and methacrylic acid.

20. The optical polymer of claim 17, comprising monomeric units of styrene and 2-hydroxyethyl methacrylate, which together account for greater than 50% by weight of the polymer.

21. The optical polymer of claim 17, comprising monomeric units of N-vinyl-2-pyrrolidone, which accounts for greater than 80% by weight of the polymer.

22. An optical polymer comprising: (a) monomeric units of one or more monomers suitable for producing optical polymeric materials; and (b) monomeric units of a light-absorbing monomer having formula I

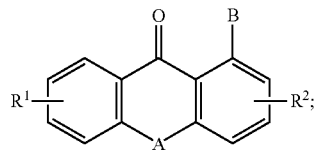

wherein A is NH or NR; B is OH, $NH_2$, or F; $R^1$ and $R^2$ are independently selected from the group consisting of H, Me, Et, i-propyl, t-butyl, F, Cl, Br, I, OH, OR, $NH_2$, $NH_3^+$, NHR, $NR_2$, $NH_2R^+$, $NR_3^+$, CN, C(O)OH, C(O)OR, C(O)R, Ar, OAr, SH, SR, S(O)OR, and D; wherein at least one of $R_1$ and $R_2$ is D; wherein Ar is an aromatic monovalent radical having 6-10 carbon atoms, and Ar comprises a single ring or a condensed ring system, optionally substituted; D is —$R^4$, —$OR^4$ or —C(O)$OR^4$, wherein $R^4$ is an aliphatic radical with four to twelve carbon atoms that includes an ethylenic polymerizable group; and R is a $C_1$-$C_6$ alkyl.

* * * * *